US007543360B2

(12) United States Patent
Campbell

(10) Patent No.: US 7,543,360 B2
(45) Date of Patent: Jun. 9, 2009

(54) FLEX ACCOMMODATING CABLE TERMINATIONS

(75) Inventor: Richard V. Campbell, Tallahassee, FL (US)

(73) Assignee: Bright Technologies, LLC., Havana, FL (US)

( * ) Notice: Subject to any disclaimer, the term of this patent is extended or adjusted under 35 U.S.C. 154(b) by 920 days.

(21) Appl. No.: 10/946,283

(22) Filed: Sep. 21, 2004

(65) Prior Publication Data

US 2006/0062525 A1 Mar. 23, 2006

(51) Int. Cl.
*F16G 11/00* (2006.01)

(52) U.S. Cl. ...................... 24/129 R; 24/122.6; 24/136; 403/371; 52/223.13

(58) Field of Classification Search ....................... None
See application file for complete search history.

(56) References Cited

U.S. PATENT DOCUMENTS 5,369,849 A * 12/1994 De France ................ 24/136 R

* cited by examiner

*Primary Examiner*—Jack W. Lavinder
(74) *Attorney, Agent, or Firm*—J. Wiley Horton

(57) ABSTRACT

Cable terminations having features which reduce stress in the transition between the potted region and the freely flexing region of a cable when the cable flexes laterally with respect to the anchor. Several favorable geometries are disclosed. The use of a supplemental buffer material to reduce stress is also disclosed.

17 Claims, 32 Drawing Sheets

18

50

10

60

FLEX ACCOMMODATING CABLE TERMINATIONS

BACKGROUND OF THE INVENTION

1. Field of the Invention

This invention relates to the field of synthetic cables. More specifically, the invention comprises a cable termination which allows a cable to freely flex without placing excessive stress on the cable strands.

2. Description of the Related Art

Devices for mounting a termination on the end of a cable are disclosed in detail in copending U.S. Application Ser. No. 60/404,973 to Campbell, which is incorporated herein by reference.

The individual components of a wire rope are generally referred to as "strands," whereas the individual components of synthetic cables are generally referred to as "fibers." For purposes of this application, the term "strands" will be used generically to refer to both.

Some type of fitting must typically be added to a cable in order to transmit a load to the cable. An old example of this idea is to wrap one end of a cable back upon itself—usually around an "eye" or "thimble" device—then clamp the cable to itself with one or more U-bolts. The resulting assembly on the end of the cable is referred to as a "termination."

It is known to terminate the strands of a synthetic cable by locking them into an anchor. The strands can be locked in place using a mechanical clamp, solidified potting compound, or other known approaches. The use of potting compound is perhaps the most common. For this approach, the strands are typically splayed into a diverging pattern and infused with liquid potting compound (using a variety of known techniques). The liquid potting compound is any substance which transitions from a liquid to a solid over time. The most common example would be a cross-linking adhesive such as an epoxy. Those skilled in the art know that such adhesives use two separate liquids which cross-link when mixed together. Such a liquid is mixed just prior to wetting the strands.

The wetted strands are at some point placed in a cavity within the anchor (in some cases prior to wetting and in some cases after wetting), so that when the liquid potting compound hardens the strands will be locked to the anchor. The anchor and the portion of cable locked therein are then collectively referred to as a termination.

FIG. 1 shows a prior art termination 14 for a synthetic cable (in a sectional view). Anchor 18 features an expanding cavity 28 joined to a straight portion 38. The hardened potting compound forms potted region 16, in which the strands are locked rigidly in place. The portion of cable 10 below the anchor (with respect to the orientation shown in the particular view) is relatively free to flex. The transition from the freely flexing portion of the cable to the portion locked within the potting compound is denoted as potting transition 20.

The reader should at this point consider the differences between traditional wire rope strands and modern synthetic cable strands. Wire rope strands are relatively large, relatively stiff, and have a moderate surface coefficient of friction. Synthetic cable strands are, in comparison, quite small, have very little stiffness, and have a very low coefficient of friction. Synthetic strands are analogous to human hair in terms of size and stiffness. These differences mean that termination techniques traditionally used for wire rope cannot be used for synthetic cables—or at least not without substantial modification.

Those skilled in the art will know that the maximum theoretical stress a cable can withstand (force per unit area) is 100% of the maximum theoretical stress an individual strand can withstand. In practice, of course, the cable as a whole never reaches 100% of the strand strength. In wire rope applications, an ultimate cable stress of 70% of the individual strand stress is quite good.

Of course, numerous other factors degrade the ultimate stress a cable can withstand. Bending of the cable is perhaps the most significant of these. A cable is ideally loaded while in perfect alignment. Deviations from this alignment degrade the performance. One particularly worrisome situation is where a cable is fixed at one end within an anchor and the freely flexing portion is then bent with respect to the anchor. FIG. 9 shows such a situation.

Wire ropes tolerate this condition fairly well. Their strand stiffness—the strands are typically steel—preserves the cable's circular cross section as it passes through an arcuate bend. The stiffness—as well as the internal friction between the strands—means that the strands stay well organized. Thus, the loss of ultimate tensile strength a wire rope experiences when undergoing a bend is manageable.

This is not true for synthetic cables. FIG. 2 shows a synthetic cable termination undergoing a significant bend. Flexible region 30 of cable 10 has been pulled to one side, forming a first kink 22 where the cable exits the anchor and a second kink 72 where the cable exits the potted region. These two kinks—which may be significantly different in nature—place considerable stress on the individual strands, and may even break or cut some strands. The cable has also flattened substantially in the region of second kink 72. The result is that the majority of the load is carried by a relatively small number of strands.

FIG. 3 shows another type of prior art anchor 18. The version shown does not include a straight portion. A relatively sharp corner is present proximate potting transition 20. This sharp corner exacerbates the problem seen in FIG. 2, since the sharp corner may actually cut synthetic strands which are forced against it (Solidified potting compound often creates a very sharp edge).

FIG. 3A shows a greatly magnified view of potting transition 20. The portion of the strand 32 lying within potted region 16 is held in alignment. Where it exits the hardened potting compound, however, it undergoes an immediate sharp bend. This bend produces stress concentration 66. FIG. 3A represents a very uniform ("good") potting transition. However, the reader will perceive how substantial stress concentration in individual strands can nevertheless occur.

FIG. 4 shows the kinking of the individual fibers against a sharp corner where they exit an anchor. Strands at this point are subject to axial compression and bending compression. Such lateral loading are often cyclic in nature, resulting in "flex fatigue" (a condition of accumulating plastic deformation or outright breakage of the individual cable strands).

The strands actually forced against the corner may even be cut. Synthetic cable strands have little cut resistance in comparison to wire rope strands. This fact represents yet another difference between synthetic cables and wire ropes. Strand cutting is a much larger concern for synthetic cables.

Looking now at FIG. 5, the reader will note that the potting transition 20 is typically irregular in shape, since the infusion of the liquid potting compound through the strands may not be uniformly planar. A portion of hardened potting compound can extend into the freely flexing region of cable near the cable's centerline. This portion often breaks free when the cable is flexed laterally. The existence of the solid region—even when broken free—tends to kink and abrade the cable's strands.

Some prior art anchors have included features which could mitigate the aforementioned problems somewhat (at least insofar as they reduce an edge actually cutting into the cable). These features are typically the result of manufacturing convenience or cosmetics, rather than any specific attempt to address the problem of flexural loads. FIG. 6 shows an anchor 18 having a small fillet 24 around its lower edge (the fillet joins the lower surface and, in this case, the wall of straight portion 38). (Throughout this disclosure, directional terms such as "upper" and "lower" will be understood to refer only to the orientation shown in the view. The devices disclosed will obviously function in any orientation).

FIG. 7 shows an anchor 18 having a small chamfer 26 around its lower edge. Such a chamfer is sometimes added to prevent a sharp corner existing at the bottom of expanding cavity 28 (For an anchor having no straight portion, this feature can be particularly important). Such fillets and chamfers have traditionally been added to facilitate machining of the anchors on a lathe or automatic screw machine. Those skilled in the art will know that a sharp corner at the mouth of a bore is undesirable for such machining.

While some flex-mitigating features are found in the prior art terminations, they do not readily accommodate substantial lateral flexing of the cable. Thus, when such terminations are attached to an object, the attachment must allow the anchor to move freely so that it remains aligned with the cable. Suitable attachments include ball and socket joints. However, it is often desirable to attach the anchor to an object without allowing any movement. An example would be an externally threaded anchor which is threaded into a hole in a plate. Once installed, the anchor will be rigidly held.

The prior art includes certain strain-relieving devices. FIG. 16 shows the addition of a soft boot 44 encircling the portion of cable 10 which is immediately adjacent to anchor 18. Made of a pliable material—such as a hard rubber—the soft boot can reduce strand kinking. FIG. 17 shows another type of boot—designated as external boot 46. This version attaches to the outside surface of anchor 18, while still surrounding the portion of the cable which is adjacent to the anchor.

Unfortunately, it is difficult to design a soft boot which can accommodate the different loads and different bending angles which can be placed on a cable. FIG. 18 shows a soft boot using a relatively stiff material. The cable tends to bend near the exit of the boot, causing bend point 48. Thus, the unwanted bend has merely been shifted downward rather than eliminated.

In order to reduce this phenomenon, the designer will often substitute a more pliable compound. Such a pliable compound has been used in FIG. 19. However, at higher loads or angles, a bend point 48 still results, albeit in a higher location. The reader will thereby appreciate the difficulty in optimizing the boot stiffness using the prior art approach. Thus, while the prior art devices can reduce problems associated with the lateral flexing of a cable, a more advanced solution is desirable.

BRIEF SUMMARY OF THE PRESENT INVENTION

The present invention comprises terminations having features which reduce and control stress in the transition between the portion of the cable locked within the termination and the freely flexing region of a cable when the cable flexes laterally with respect to the anchor. Several favorable geometries are disclosed.

REFERENCE NUMERALS IN THE DRAWINGS

| | |
|---|---|
| 10 | cable |
| 14 | termination |
| 16 | potted region |
| 18 | anchor |
| 20 | potting transition |
| 22 | kink |
| 24 | fillet |
| 26 | chamfer |
| 28 | expanding cavity |
| 30 | flexible region |
| 32 | strand |
| 34 | circular expansion |
| 36 | parabolic expansion |
| 38 | straight portion |
| 40 | linear expansion |
| 42 | buffer material |
| 44 | soft boot |
| 46 | external boot |
| 48 | bend point |
| 50 | smooth expansion |
| 52 | angular range |
| 54 | shoulder |
| 56 | relieved portion |
| 58 | step relief |
| 60 | jacket |
| 62 | slotted expansion |
| 64 | intermediate termination |
| 66 | stress concentration |
| 68 | middle expansion |
| 70 | expansion bell |
| 72 | second kink |

DESCRIPTION OF THE INVENTION

Figure 8:
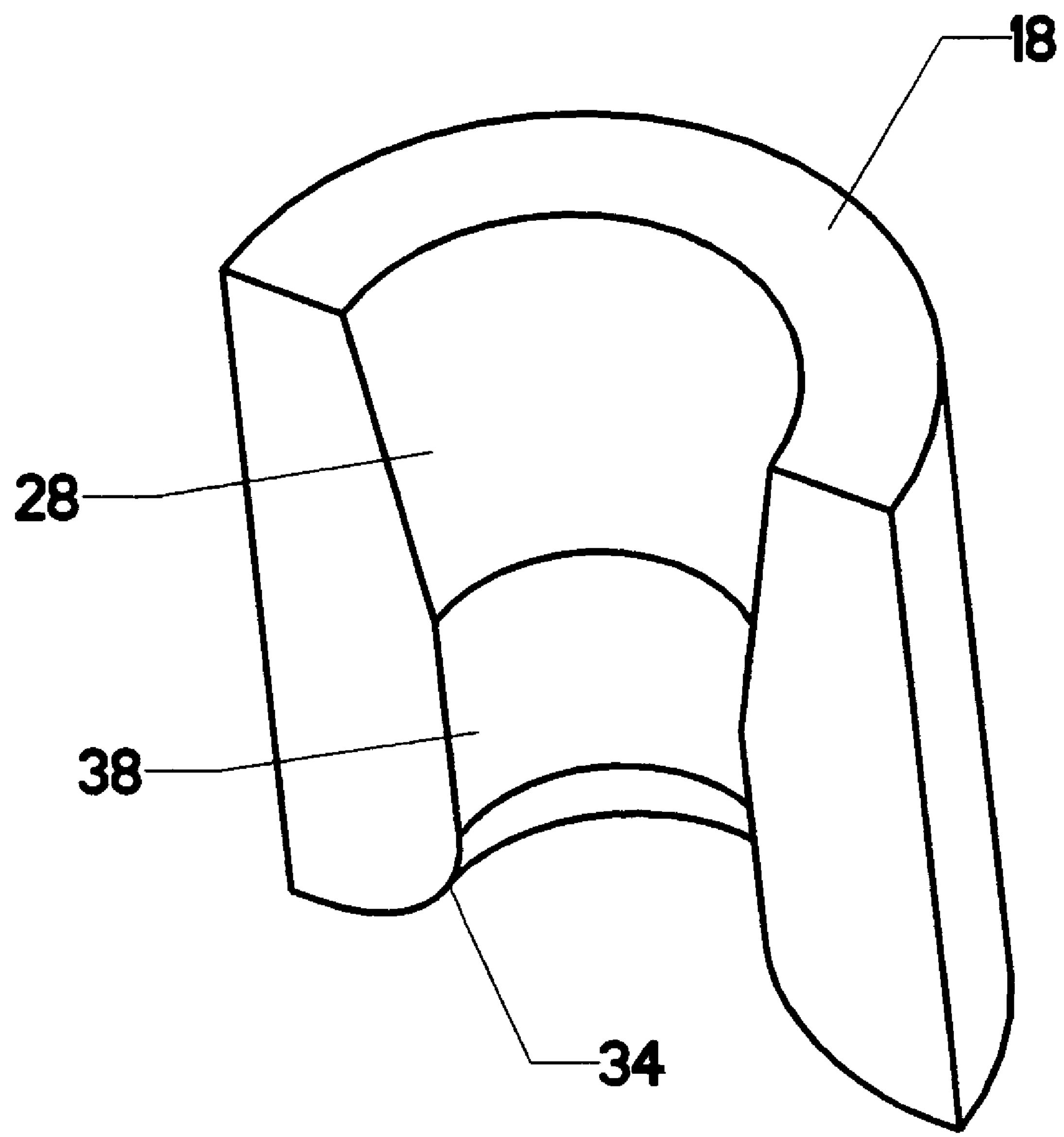
FIG. 8 is a sectional perspective view, showing one embodiment of the present invention.

FIG. 8 shows a sectional view of an anchor 18 made according to the present invention (Those skilled in the art will know that such anchors are generally radially symmetric). It features an expanding cavity 28 and a straight portion 38 as in the prior art. Circular expansion 34 is added to the bottom of straight portion 38. The radius of this circular expansion is quite large, being at least equal to the radius of the cable to be locked into the anchor.

Figure 9:
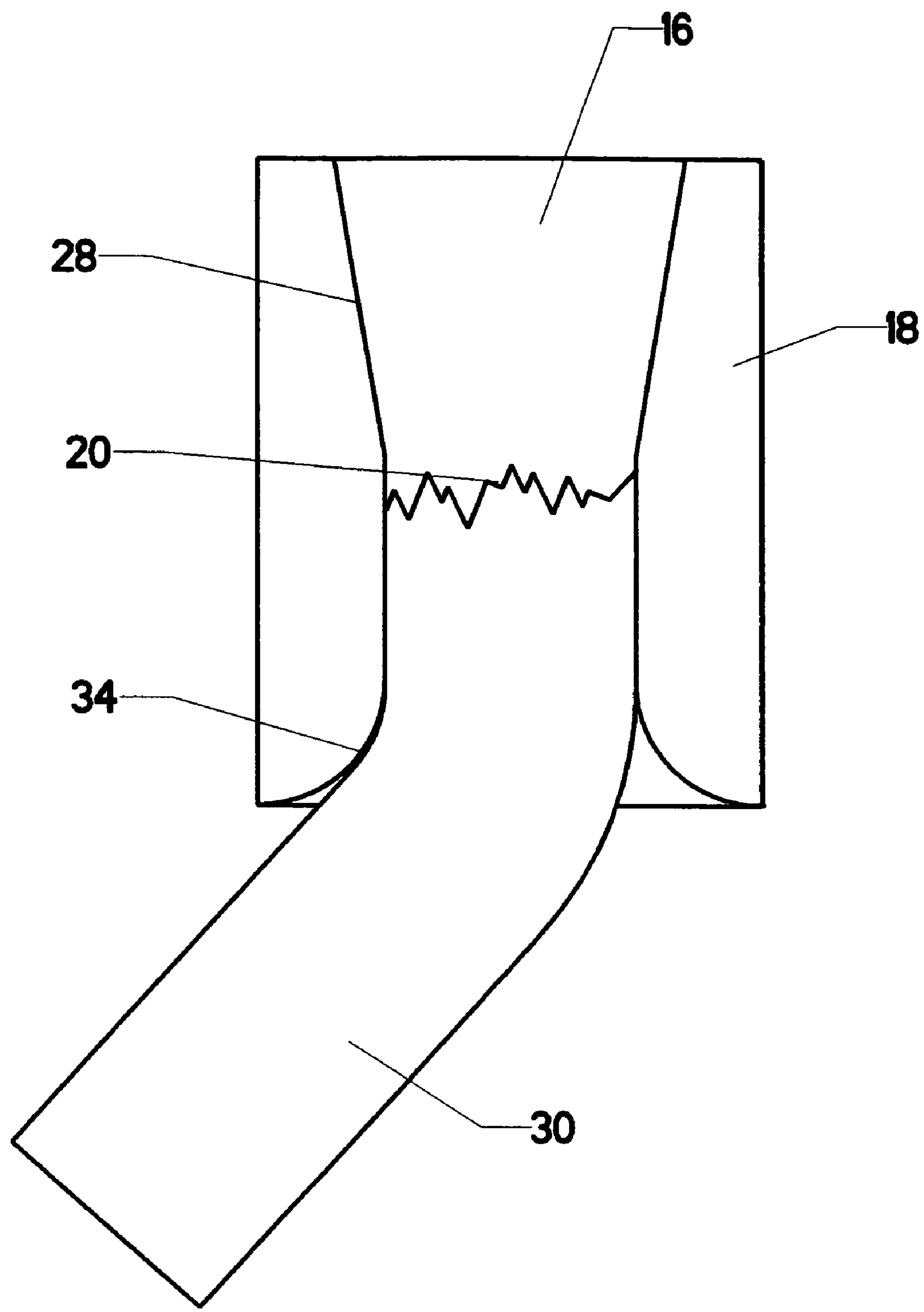
FIG. 9 is a sectional elevation view, showing one embodiment of the present invention.

FIG. 9 is an elevation sectional view through the anchor of FIG. 8, with a cable being installed and flexed laterally. In this particular example, the cable has been locked in the anchor via potting. The reader should bear in mind that the particular method of locking the cable strands into the anchor is not particularly important to the present invention. The invention can function for terminations where the strands are mechanically clamped in place within the anchor. Because potting is a very common approach, however, potting is used as the means of locking the strands within the anchor throughout the illustrations. Throughout this disclosure, the reader should bear in mind that other methods of locking the strands within the anchor could be substituted.

Those skilled in the art will also realize that the inventive features disclosed are not dependent upon the use of a particular expanding cavity 28. A linear expansion profile (conical) is shown. A curved expansion could just as easily be used. By the same token, the potted region can be locked to the anchor by using a straight cavity having threads, serrations, or other mechanically interlocking features.

In FIG. 9, potted region 16 occupies the expanding cavity and a portion of the straight portion. Potting transition 20 lies well inside the anchor, near the commencement of expanding cavity 28 (though it can lie higher up—well into the expanding cavity—or lower down in the straight portion). The present invention incorporates a smooth expansion proximate the potting transition on the side of the freely flexing portion of the cable (distal to the potted region). This smooth expansion can assume many forms.

The version shown in FIG. 9 includes a simple arcuate expansion, denoted as circular expansion 34. If the flexible region 30 of the cable is flexed laterally as shown, circular expansion 34 provides a smooth "bending shoulder" around which the cable can bend. Since the circular expansion is radially symmetric, it allows the cable to flex laterally in any direction. The reader will also note that potting transition 20, while still irregular, has been moved significantly away from the point where the cable bends.

The inclusion of the circular expansion reduces or prevents the kinking of the cable's strands, as well as reducing axial compression and radial compression. Stress concentrations are thereby minimized, meaning that the load is spread more uniformly throughout the cable's cross section. The circular expansion shown in FIG. 9 is a simple arc having a fixed radius. This radius of the circular expansion should be at least equal to the radius of the cable, though for stiffer cables (or cables having poor resistance to flexural fatigue) it may need to be up to 45 times the radius of the cable.

The use of the structure shown in FIG. 9 ensures a uniform bending radius for the cable. If, as an example, the cable is bent 5 degrees off the anchor's centerline, the bending radius will be equal to the radius of circular expansion 34. If, on the other hand, the cable is bent 45 degrees (as actually shown in FIG. 9) the bending radius will still be equal to the radius of circular expansion 34. The length of contact between the cable and circular expansion 34 obviously varies, with the length being far less for the 5 degree bend than the 45 degree bend. The bending radius remains the same, though. This fact allows the cable designer to know what bending radius the completed assembly must endure (within a reasonable range). Since this knowledge allows the prediction of ultimate strength, flexural resistance, etc., it allows the design of a much more predictable cable termination.

Figure 10:
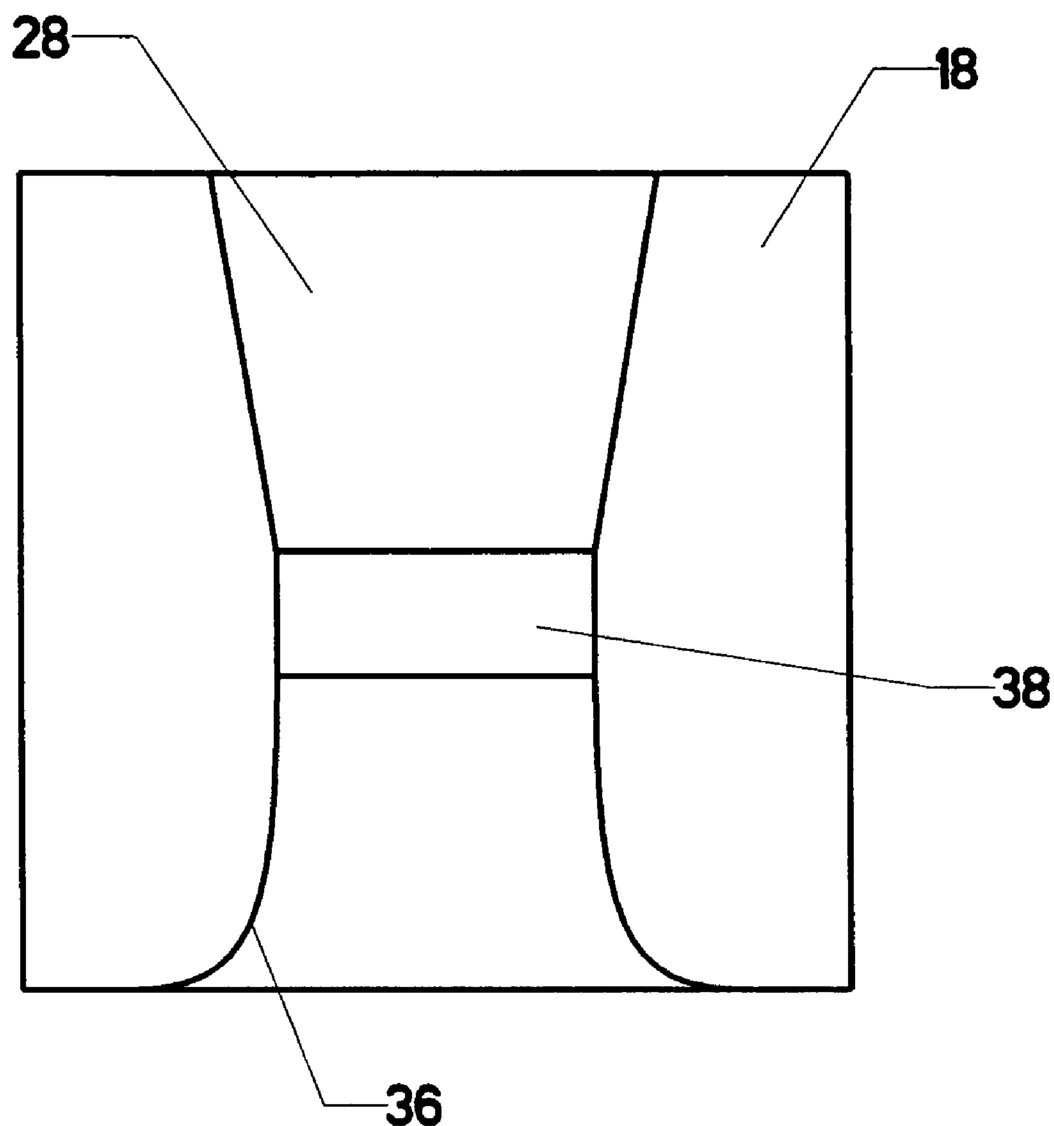
FIG. 10 is a sectional elevation view, showing one embodiment of the present invention.
Figure 11:
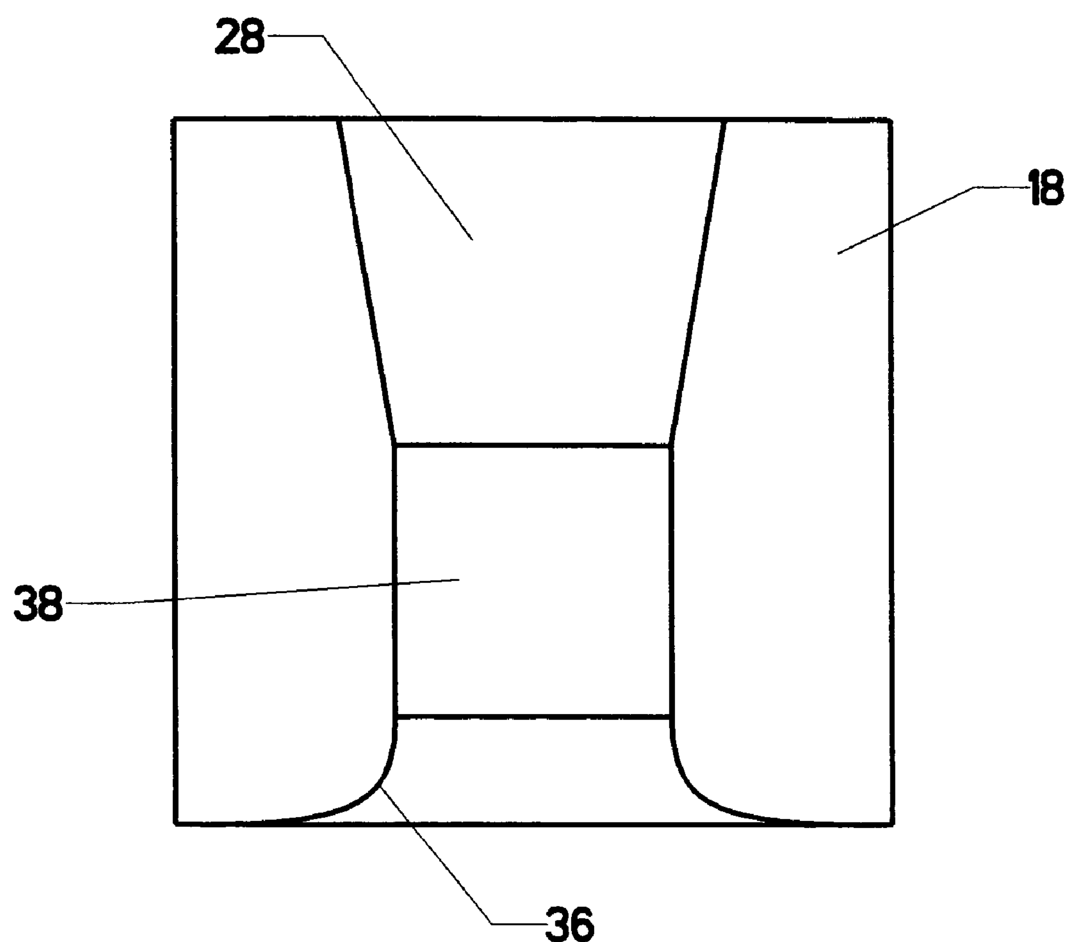
FIG. 11 is a sectional elevation view, showing one embodiment of the present invention.

Other types of smooth expansions work as well. FIG. 10 shows an anchor 18 having a parabolic expansion 36. As for FIG. 9, the potting transition can be placed within the straight portion or up within the lower portion of expanding cavity 28. FIG. 11 shows an anchor having another parabolic expansion 36, wherein the defining parabola has different coefficients. Those skilled in the art will know that many different parabolas could be applied.

Figure 12:
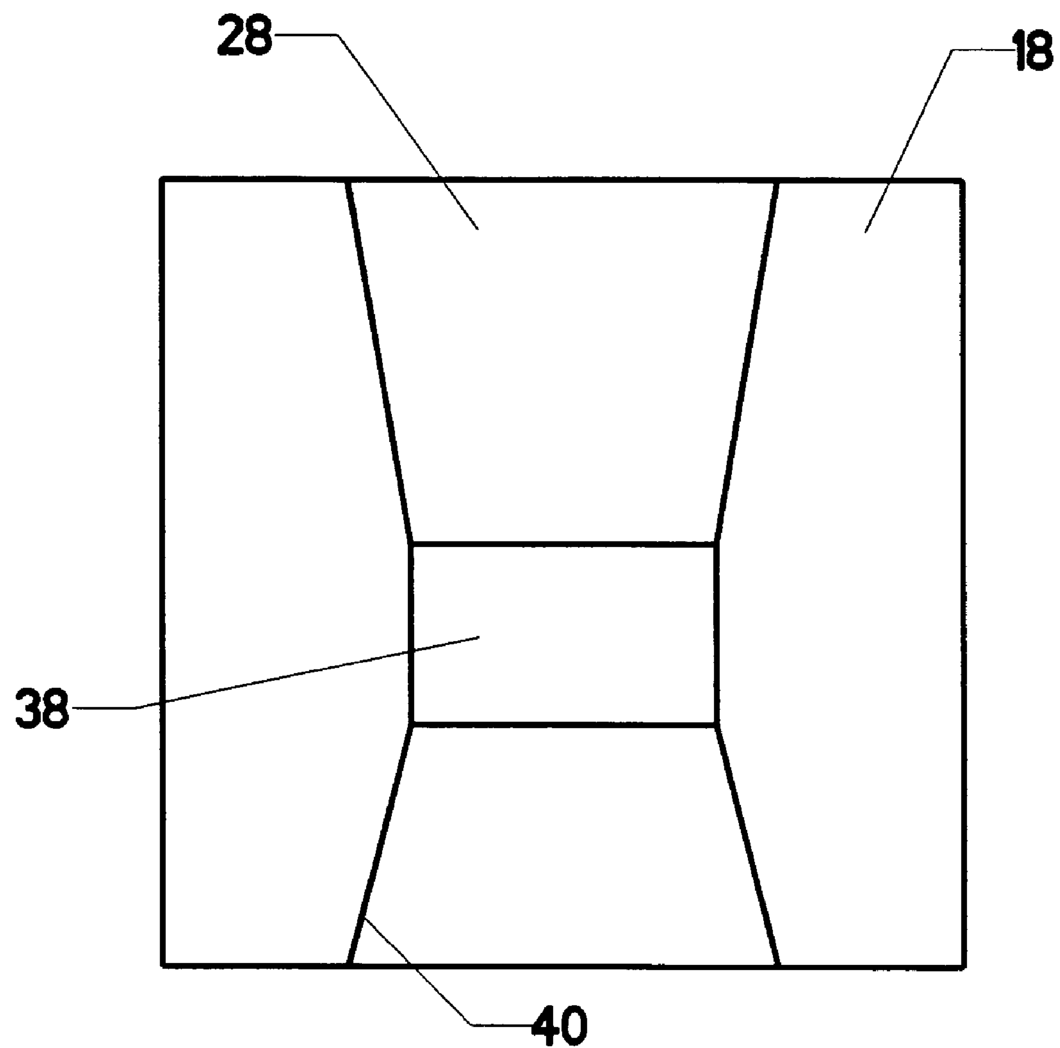
FIG. 12 is a sectional elevation view, showing one embodiment of the present invention.

The term "smooth expansion" is not intended to be limited to tangential curves. FIG. 12 shows an anchor 18 having linear expansion 40. Again, the potting transition can be placed within the straight portion or up within the lower portion of expanding cavity 28. The linear expansion allows the cable to flex laterally proximate the potting transition. While not so effective as the tangential curves, the linear expansion may be easier to manufacture, and may be suitable where only limited lateral flexing is needed.

Figure 13:
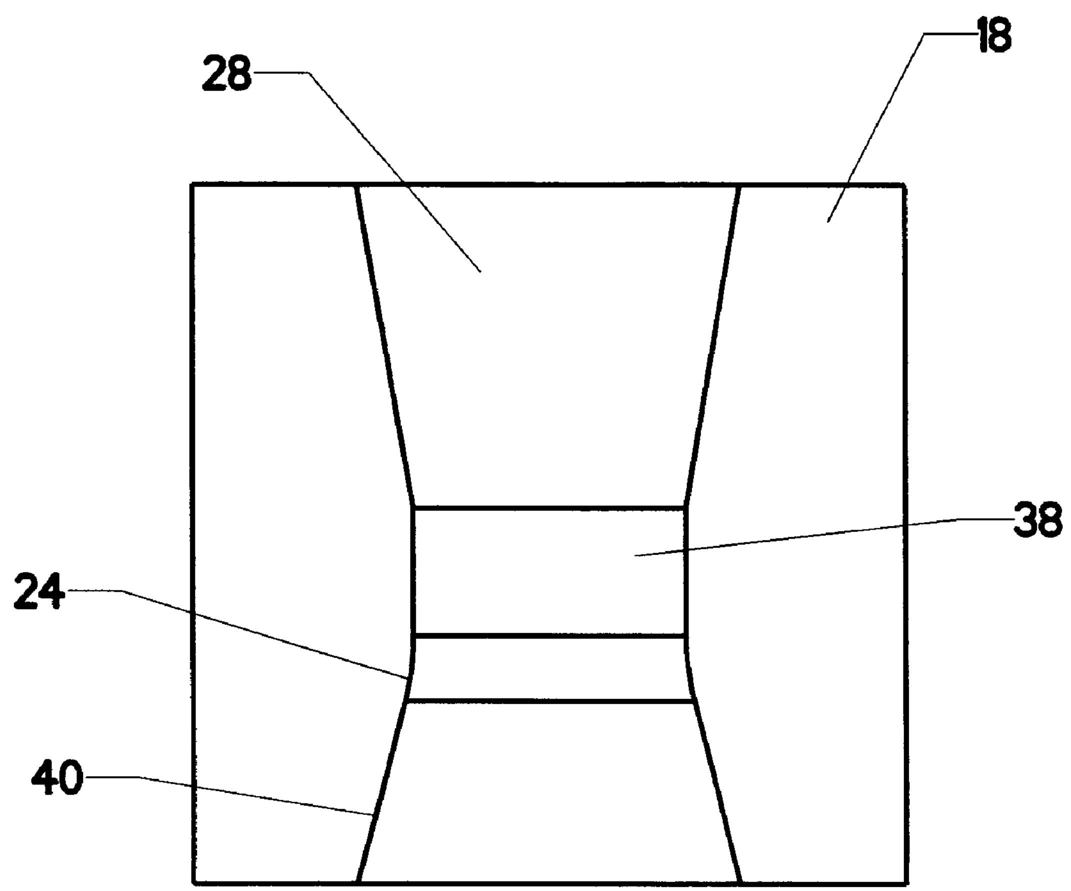
FIG. 13 is a sectional elevation view, showing one embodiment of the present invention.

Linear expansion 40 can be improved by filleting its intersection with the straight portion. Such an embodiment is shown in FIG. 13, where a fillet 24 has been added to this intersection (where the fillet may be a simple arc, a parabolic arc, or a higher-order curve). This fillet again provides a bending shoulder for the laterally flexing cable.

Figure 14:
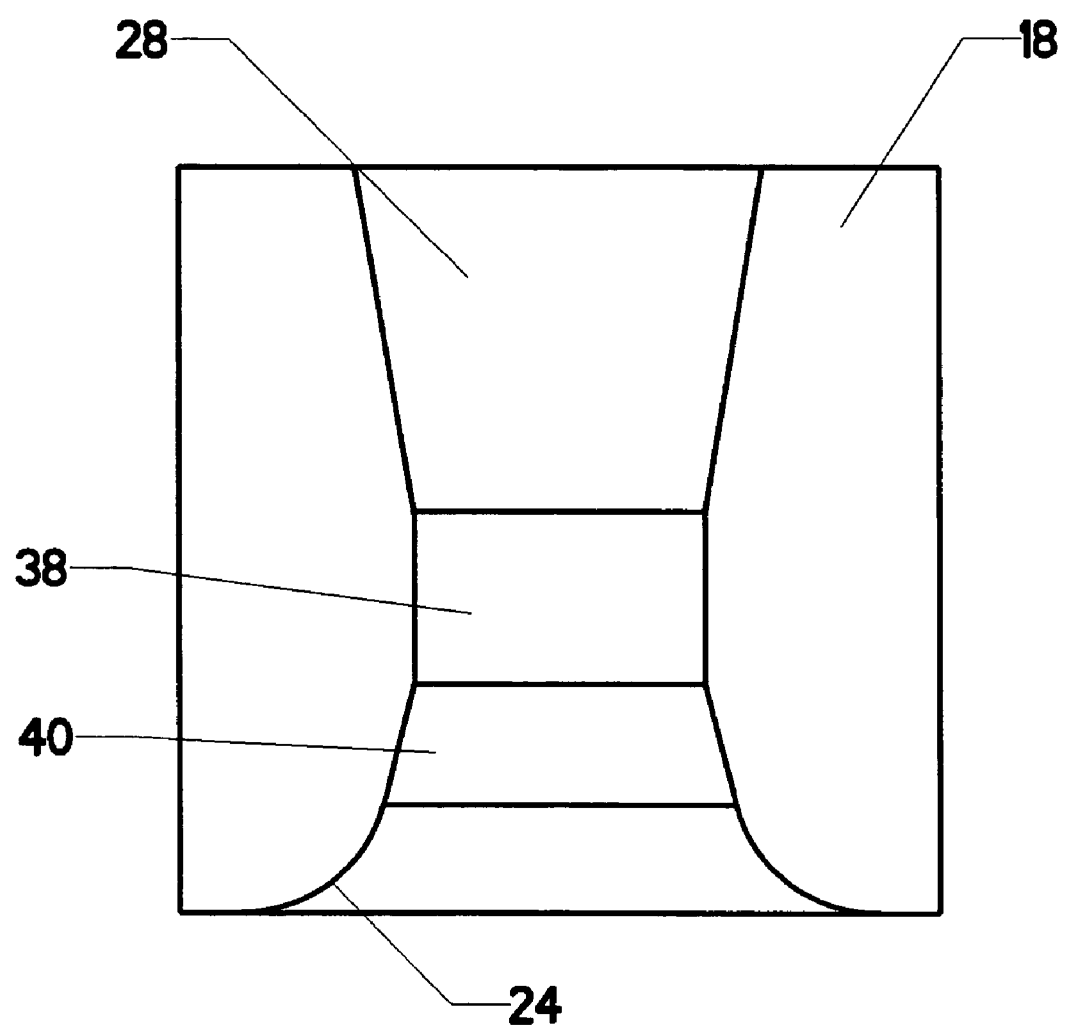
FIG. 14 is a sectional elevation view, showing one embodiment of the present invention.

Those skilled in the art will know that the addition of fillets can be helpful at many points within the anchor. FIG. 14 shows the addition of a fillet 24 at the bottom of linear expansion 40. Of course, fillets can be added in both locations (the location shown in FIG. 13 and the location shown in FIG. 14).

Ideally, these fillets should conform to the size constraints stated previously (i.e., having a radius at least as large as the radius of the cable).

Figure 15:
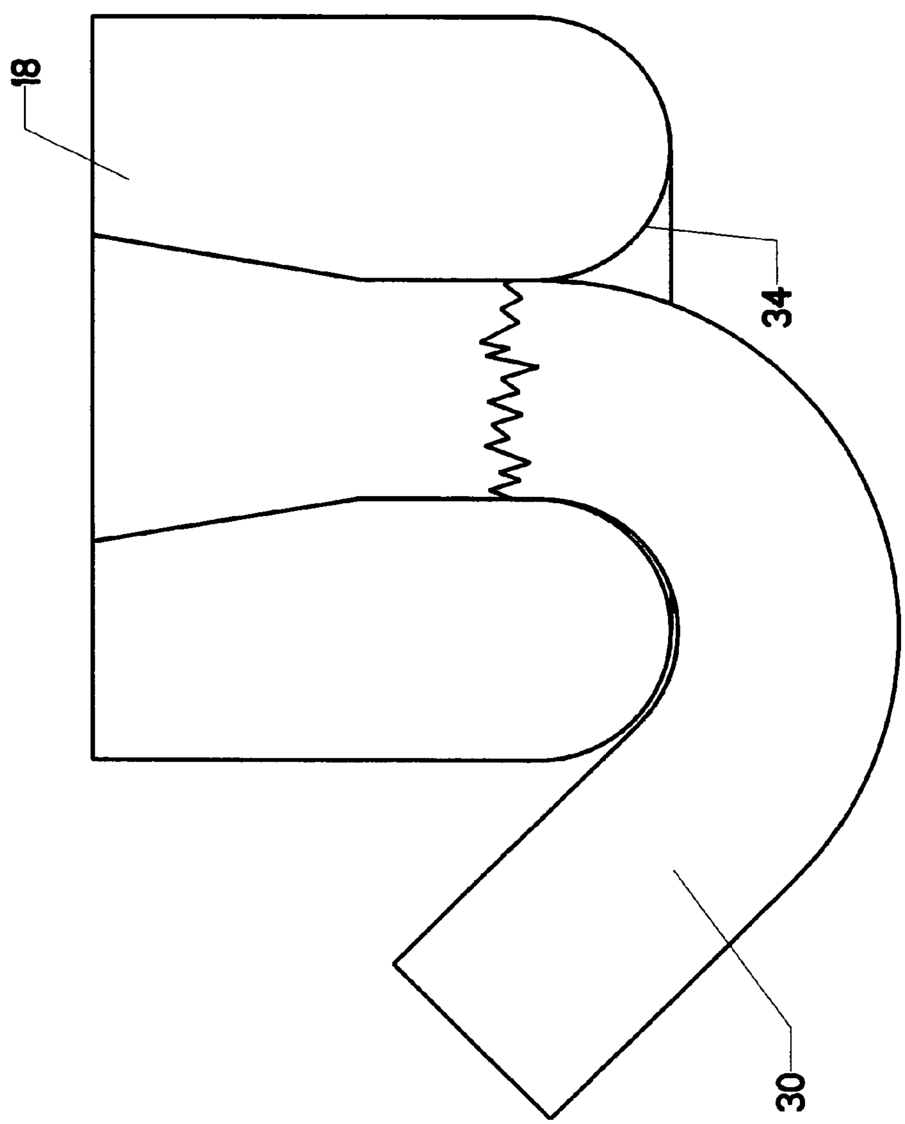
FIG. 15 is a sectional elevation view, showing one embodiment of the present invention.
Figure 16:
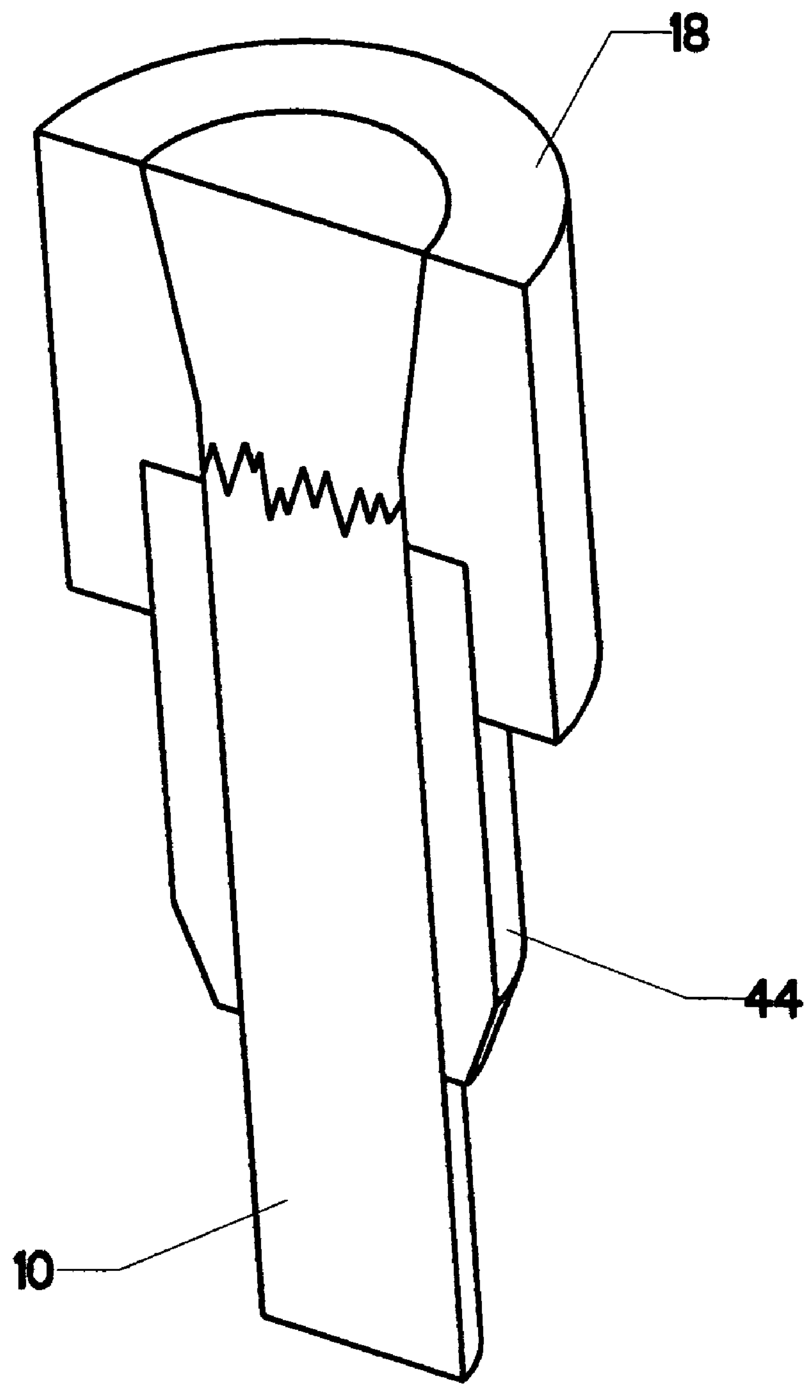
FIG. 16 is a sectional perspective view, showing a prior art boot.
Figure 17:
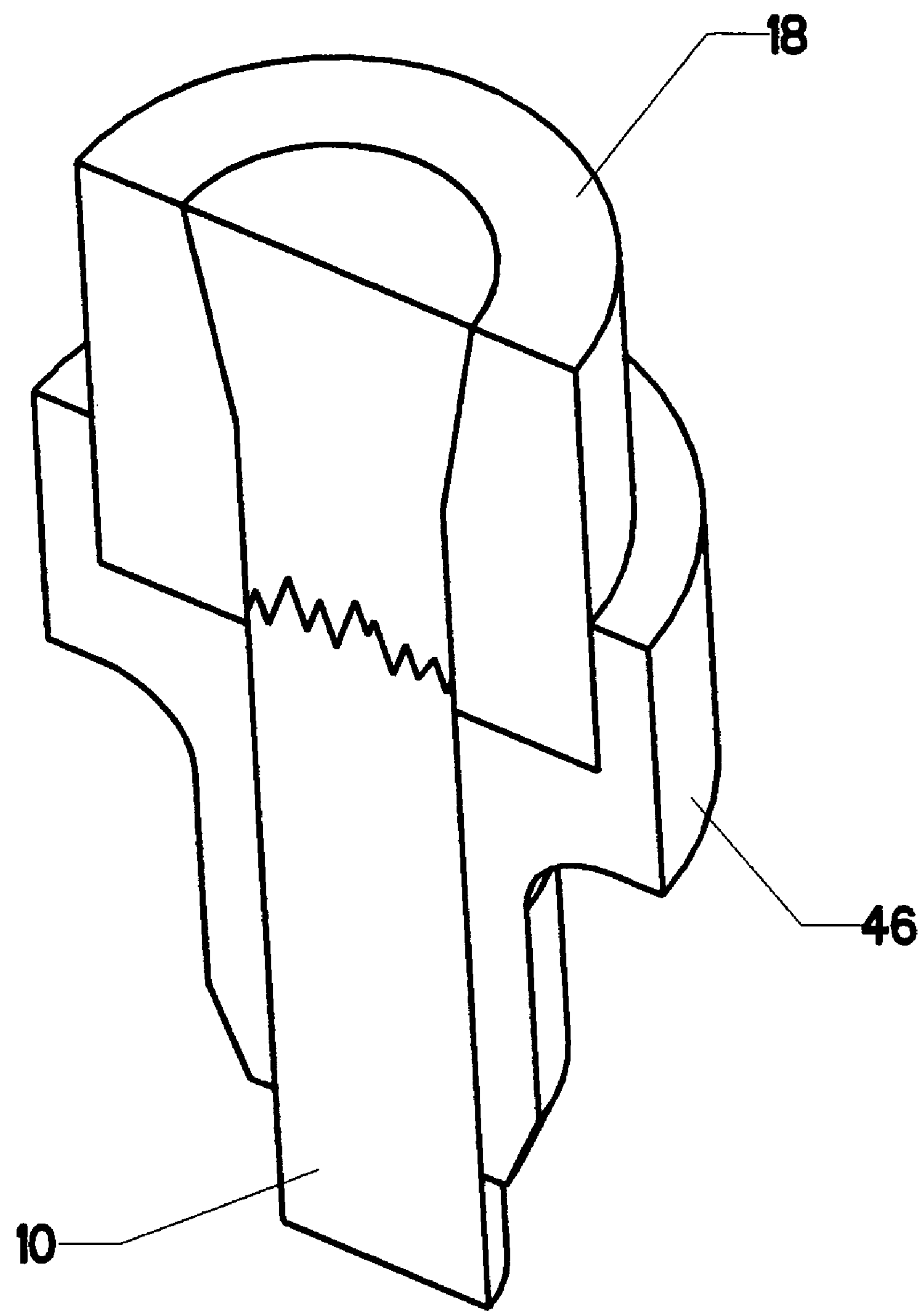
FIG. 17 is a sectional perspective view, showing a prior art boot.
Figure 18:
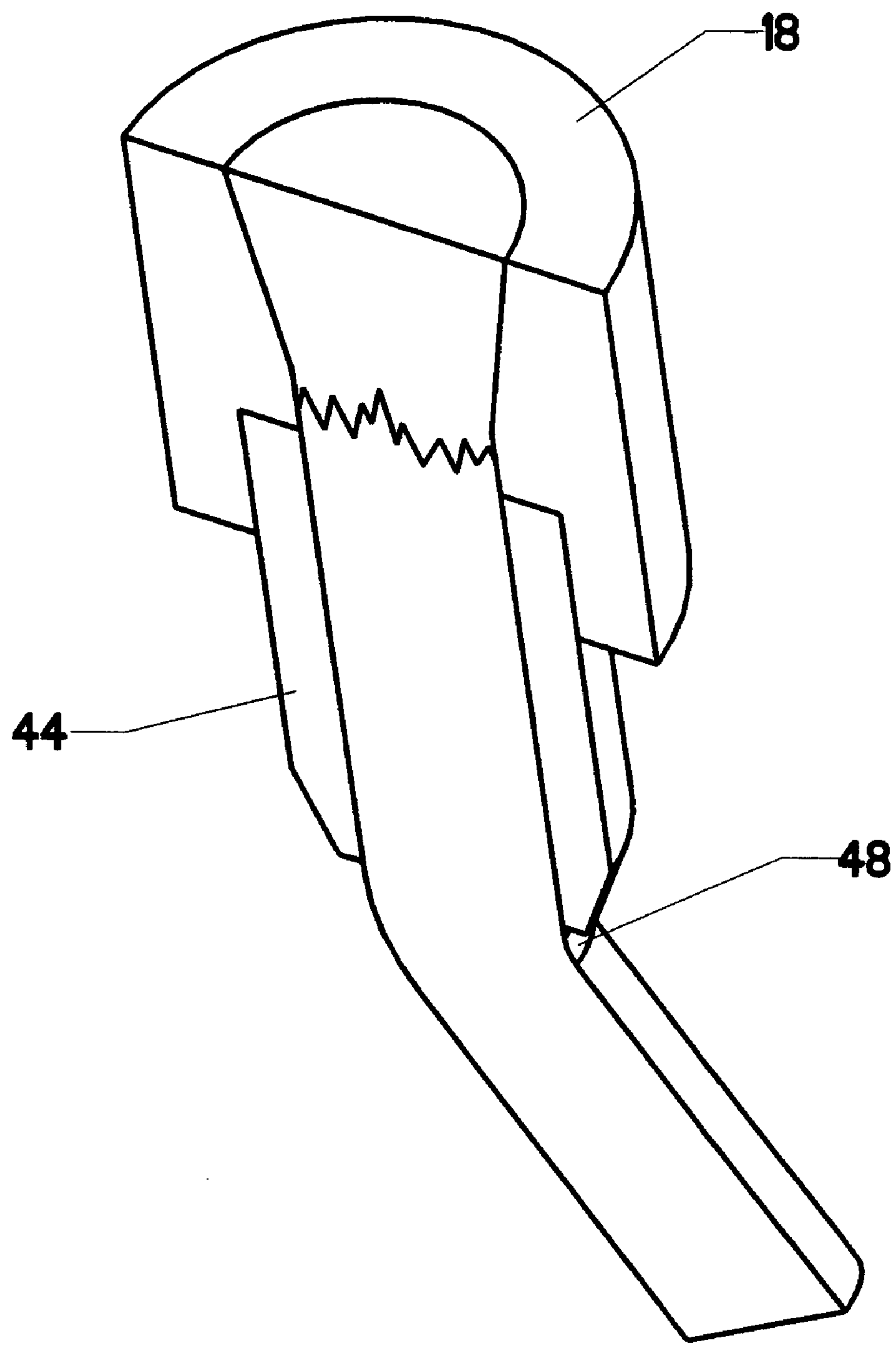
FIG. 18 is a sectional perspective view, showing a prior art boot.
Figure 19:
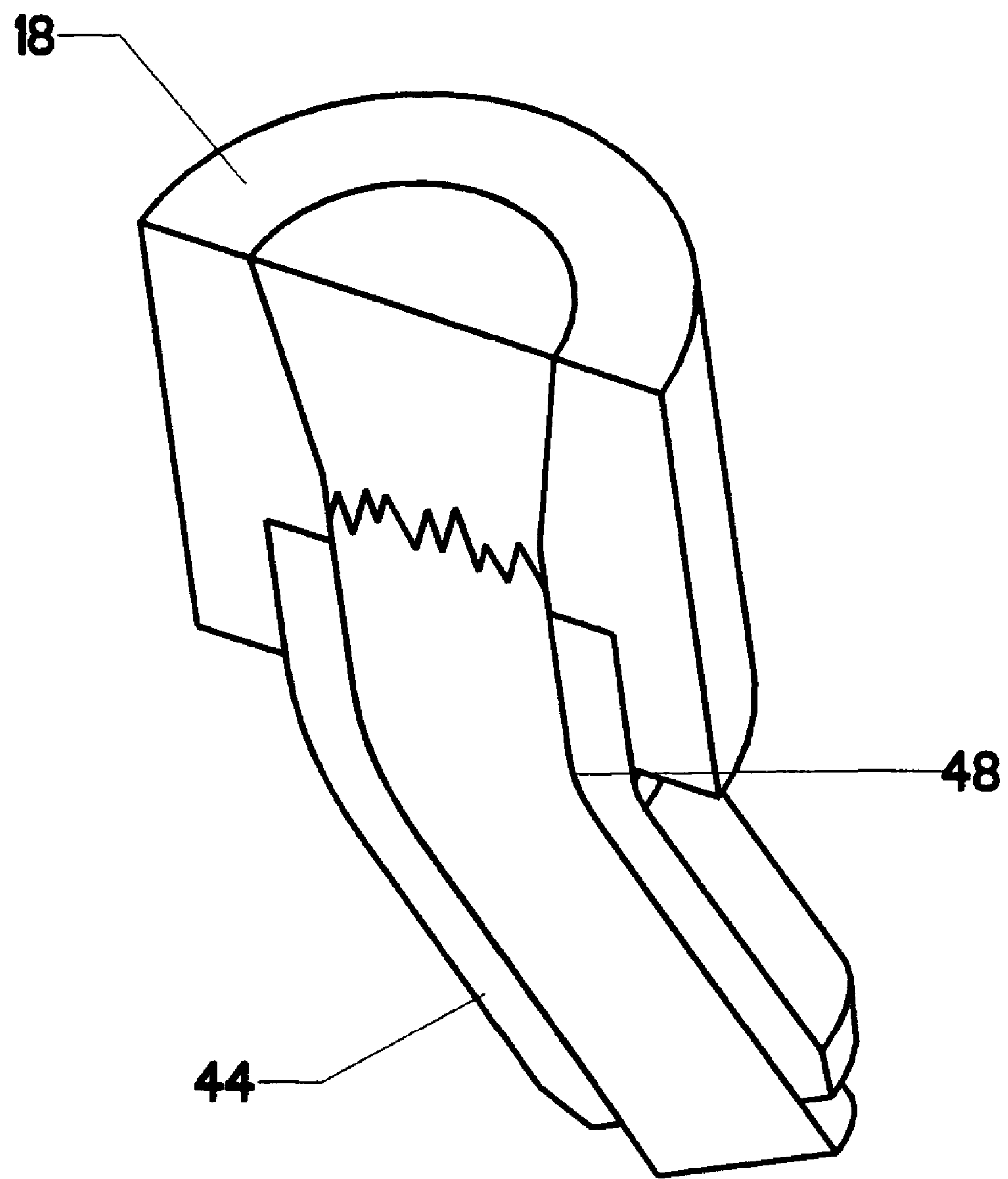
FIG. 19 is a sectional perspective view, showing a prior art boot.

The preceding examples have shown the smooth expansion only extending out to the lower surface of the anchor (with "lower" again being understood in the context of the orientation shown in the views). The smooth expansion can be carried further. It can, in fact, be carried around the bottom of the anchor and up the outside surface. FIG. 15 shows an anchor having a circular expansion 34 extending around to the outside surface. Such an expansion extends the "bending shoulder" so that a cable can be bent all the way around the anchor (up to 180 degrees). If the shoulder is carried over the top of the anchor, the bending angle could even exceed 180 degrees. Applications for such a termination are uncommon, but they do exist. As one example, a cable termination attached to the end of a cylinder rod may extend to the point where it bends the cable back over the anchor as shown.

Figure 20:
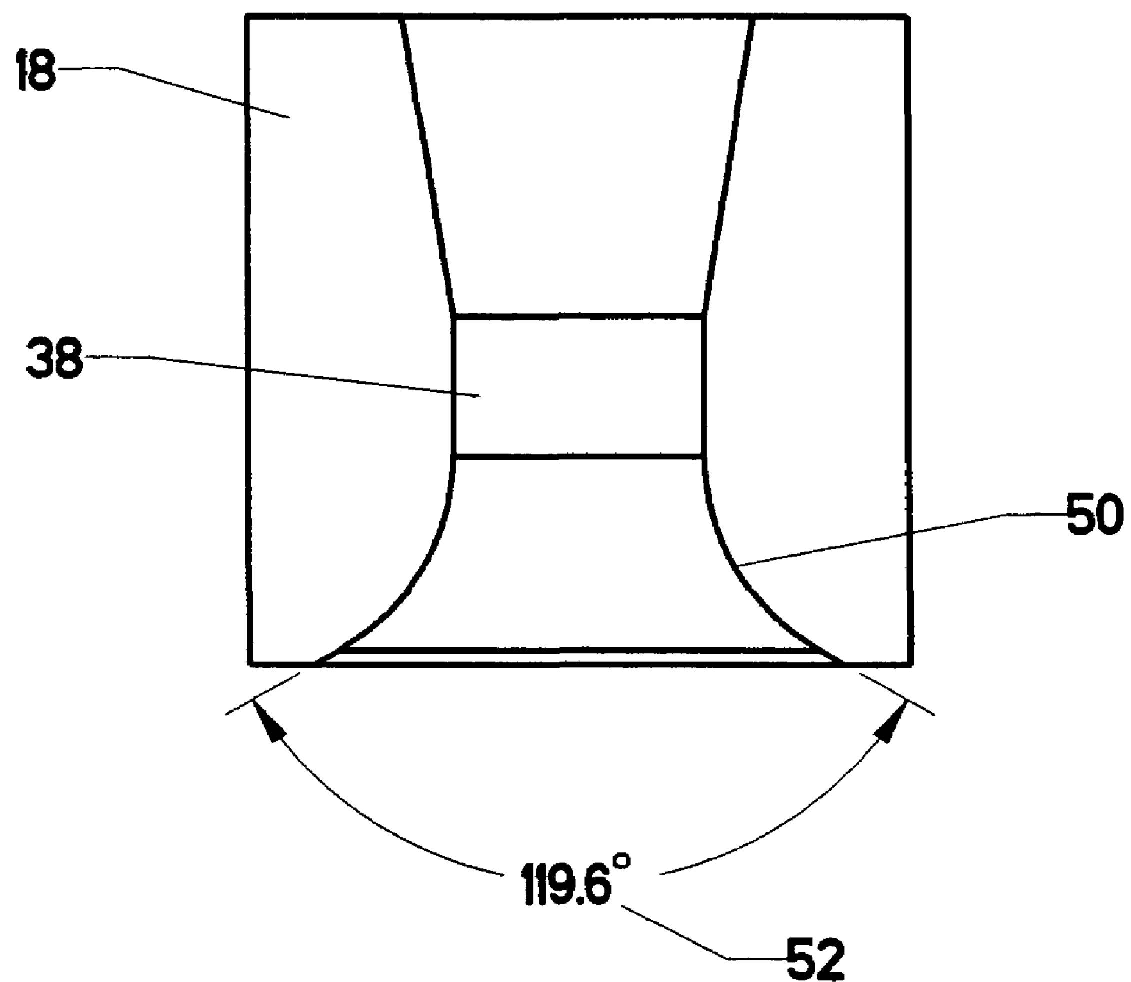
FIG. 20 is a sectional elevation view, showing one embodiment of the present invention.
Figure 24:
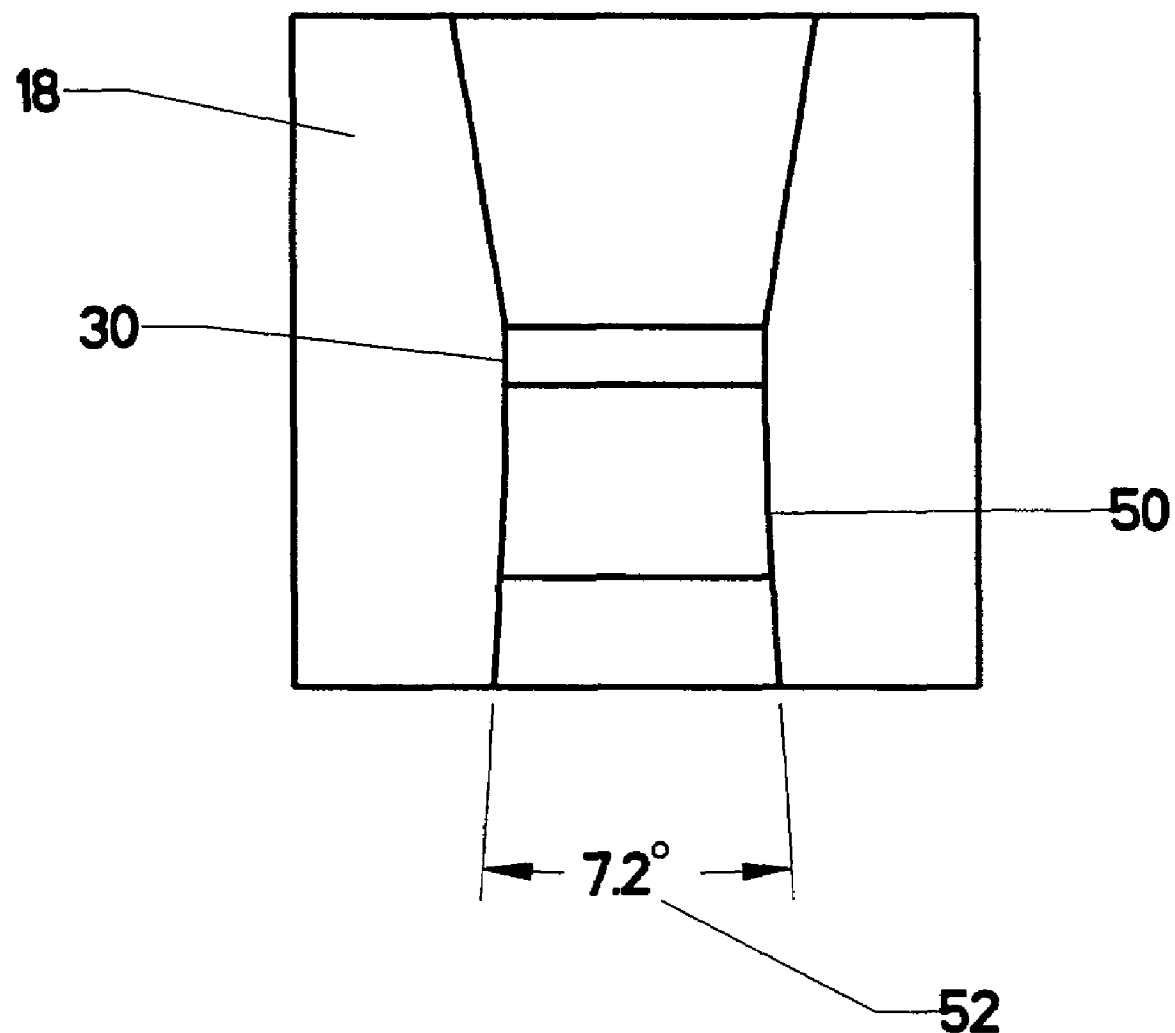
FIG. 24 is a sectional elevation view, showing one embodiment of the present invention.
Figure 25:
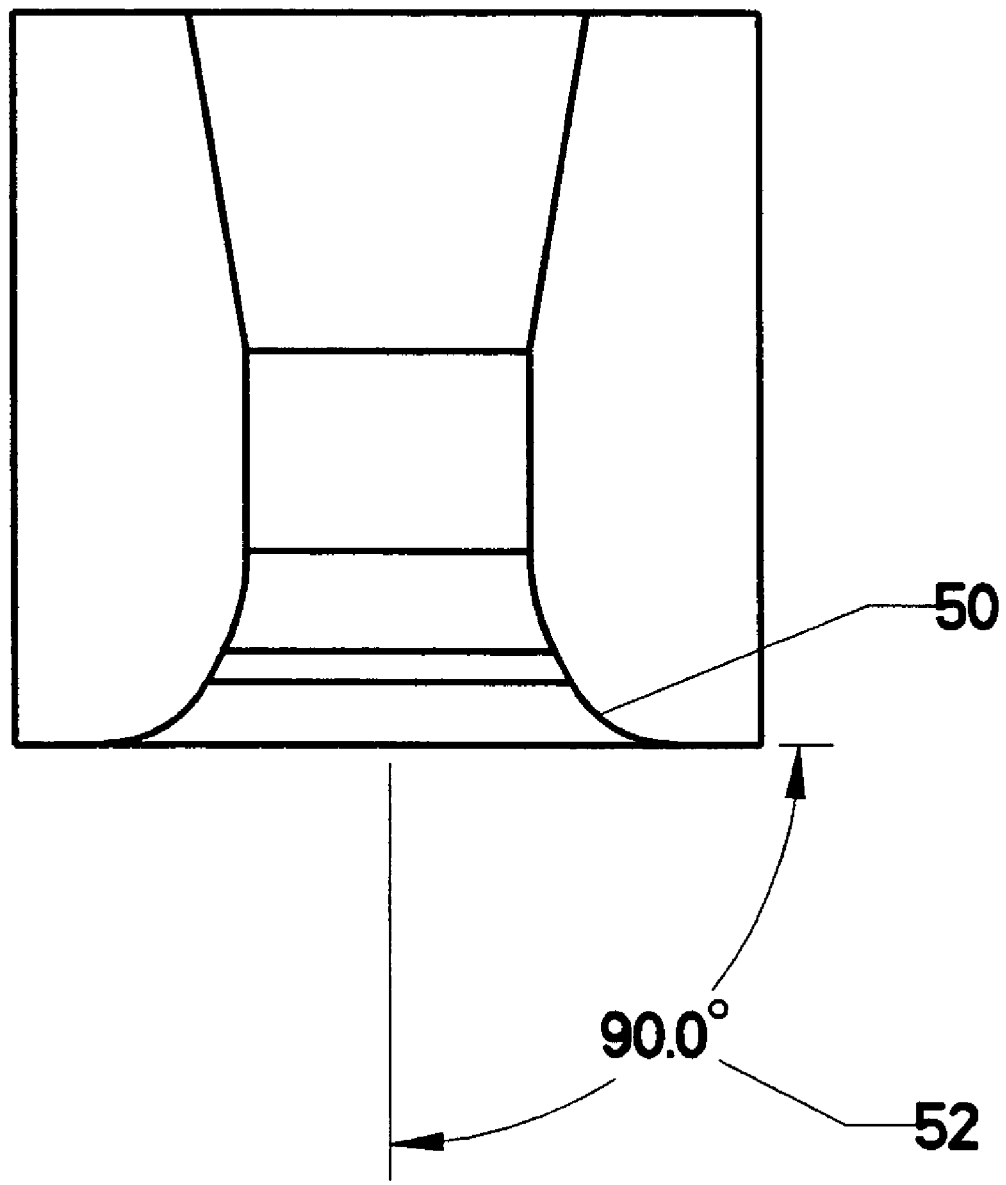
FIG. 25 is a sectional elevation view, showing one embodiment of the present invention.

The anchor geometry can be optimized for a given amount of anticipated lateral cable flexing. FIG. 20 shows an anchor 18 having a lower expanding portion designated as smooth expansion 50 (which can be a simple arc, a parabola, or higher-order curve). The angular measurement is denoted as angular range 52, which defines the maximum (positive and negative) flexure which can be accommodated before the cable is pressed against a sharp corner. For the embodiment shown in FIG. 20, angular range 52 measures 119.6 degrees. Extreme examples are possible. FIG. 24 shows a version having an angular range 52 of only 7.2 degrees, while FIG. 25 shows a version having an angular range of 180 degrees (90 degrees per side).

Figure 21:
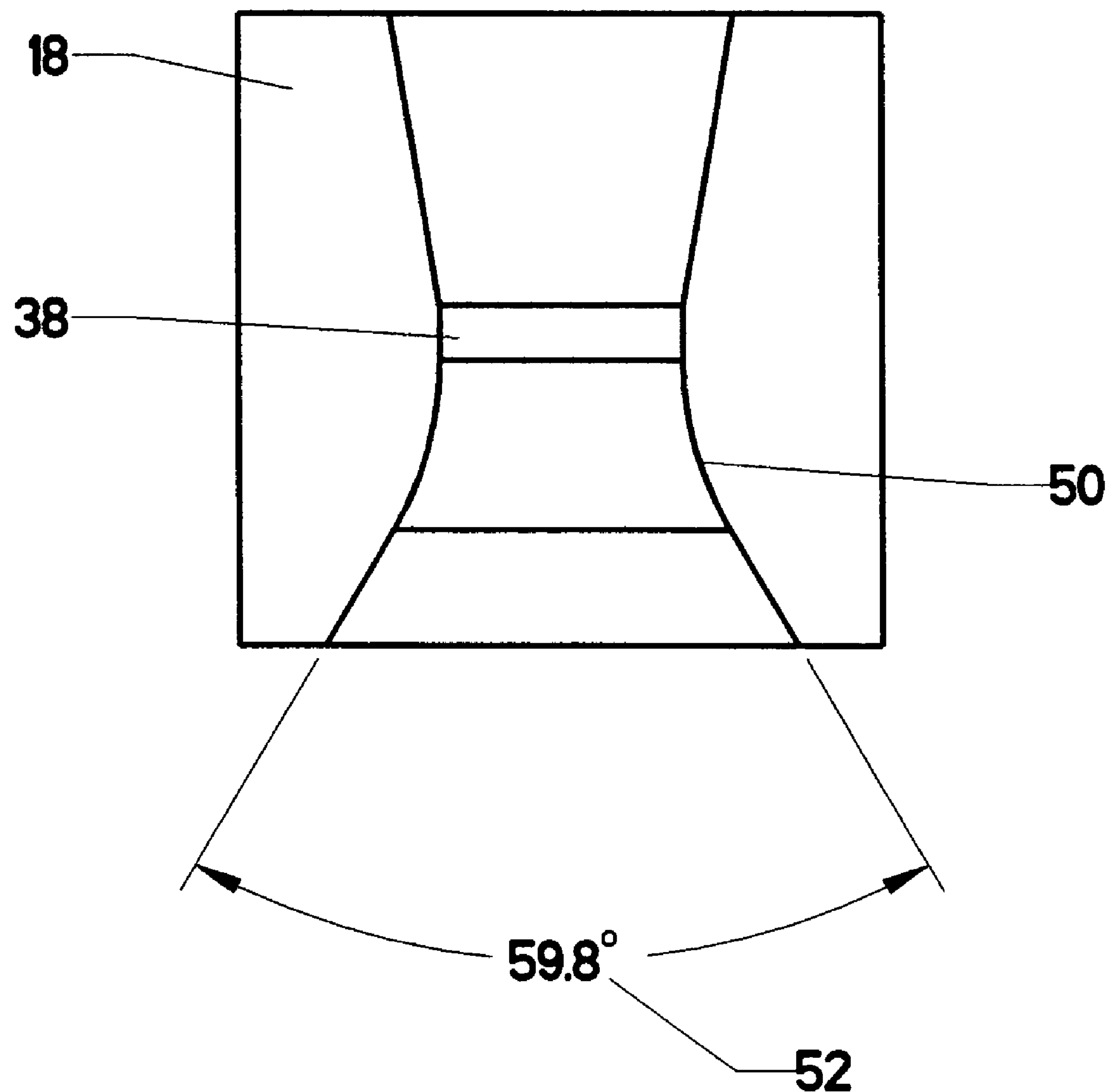
FIG. 21 is a sectional elevation view, showing one embodiment of the present invention.

FIG. 21 shows an embodiment having an angular range 52 measuring only 59.8 degrees. It uses similar geometry, but altered dimensional values. The reader will therefore understand that a given anchor geometry can be optimized for a particular application by using a specific angular range.

Figure 22:
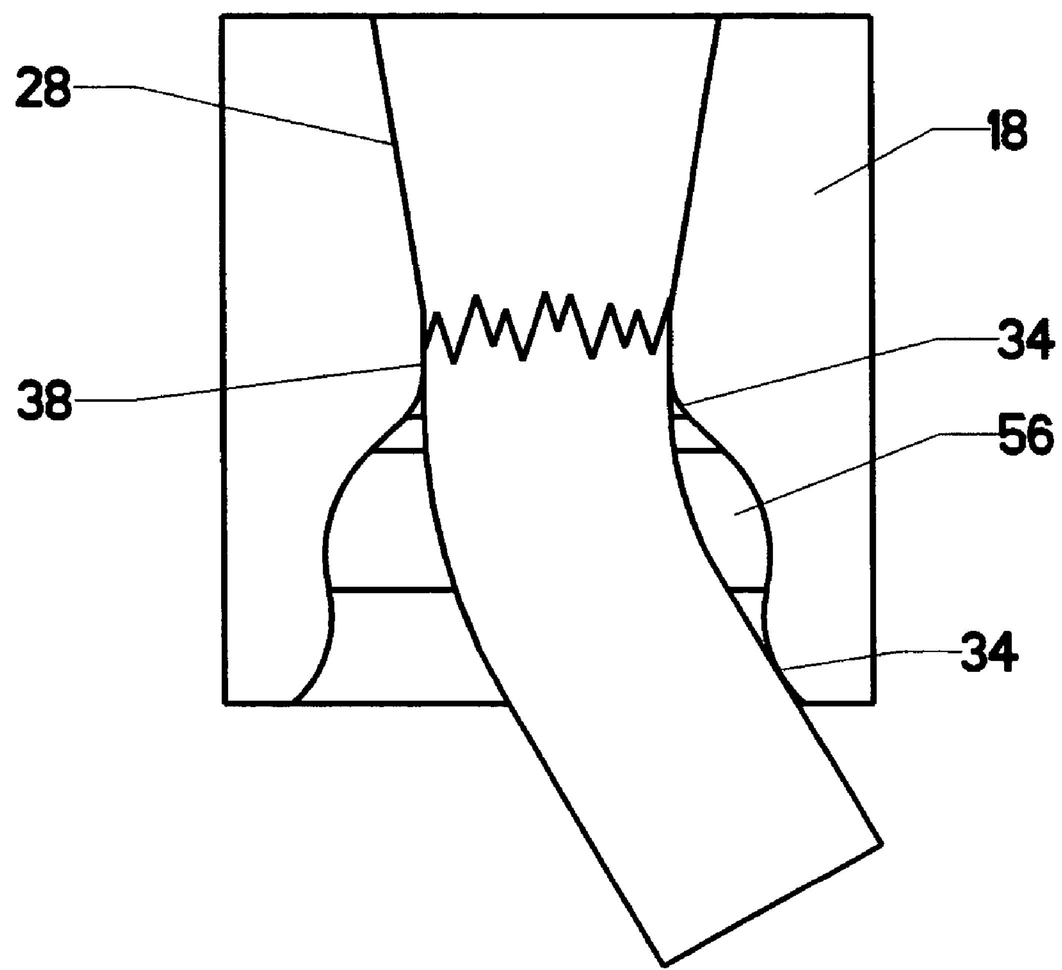
FIG. 22 is a sectional elevation view, showing one embodiment of the present invention.
Figure 23:
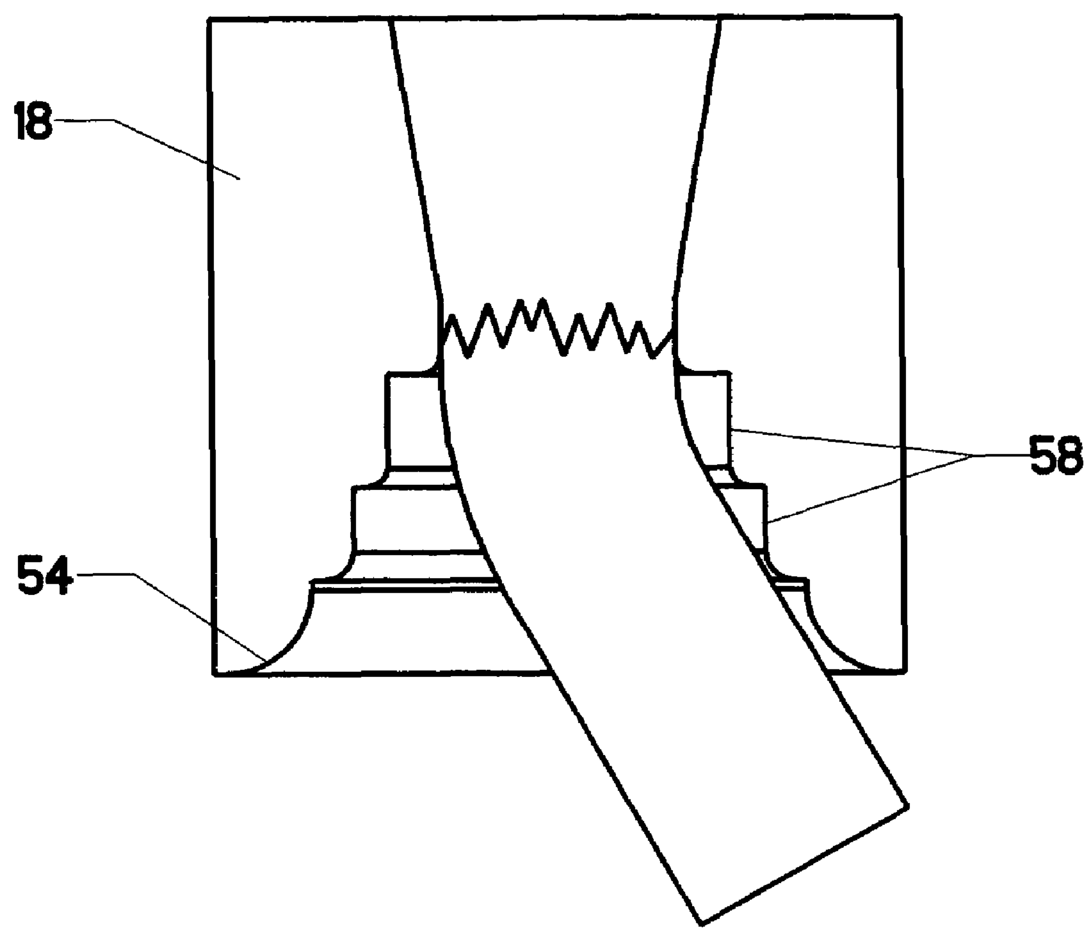
FIG. 23 is a sectional elevation view, showing one embodiment of the present invention.

More complex geometry can also be used. FIG. 22 shows an anchor 18 which includes a relieved portion 56 immediately below a first circular expansion 34 and above a second circular expansion 34. This embodiment allows a completely free movement of the cable until it bends far enough to contact the circular expansion For some applications, it may be desirable to have the anchor wall contact the cable at multiple points. FIG. 23 shows such an embodiment, which includes step reliefs 58. These provide point contacts as the cable bends over against shoulder 54. The size and shape of the step reliefs can be varied to produce many different effects.

Figure 26:
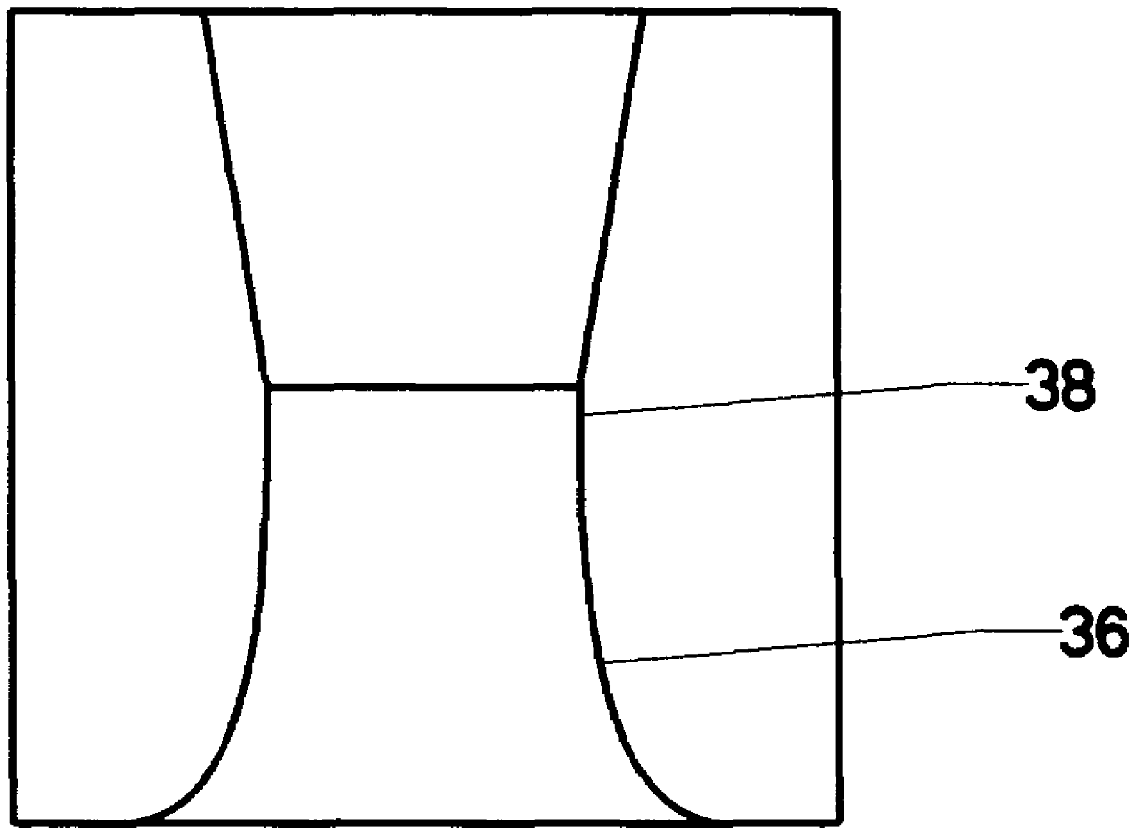
FIG. 26 is a sectional elevation view, showing one embodiment of the present invention.

The previous embodiments used a straight portion immediately above the expanding portion where the cable exits the anchor. This straight portion need not be entirely straight. FIG. 26 shows an anchor having a "straight" portion 38 which is not purely cylindrical. Parabolic expansion 36 actually extends all the way up to expanding cavity 28. The portion right next to expanding cavity 28 is almost flat (It asymptotically approaches the vertical). It then smoothly blends into a rapidly expanding portion near the bottom of the anchor. The nearly-vertical portion of the parabolic side wall serves the purpose of the straight portion found in the other versions.

Figure 1:
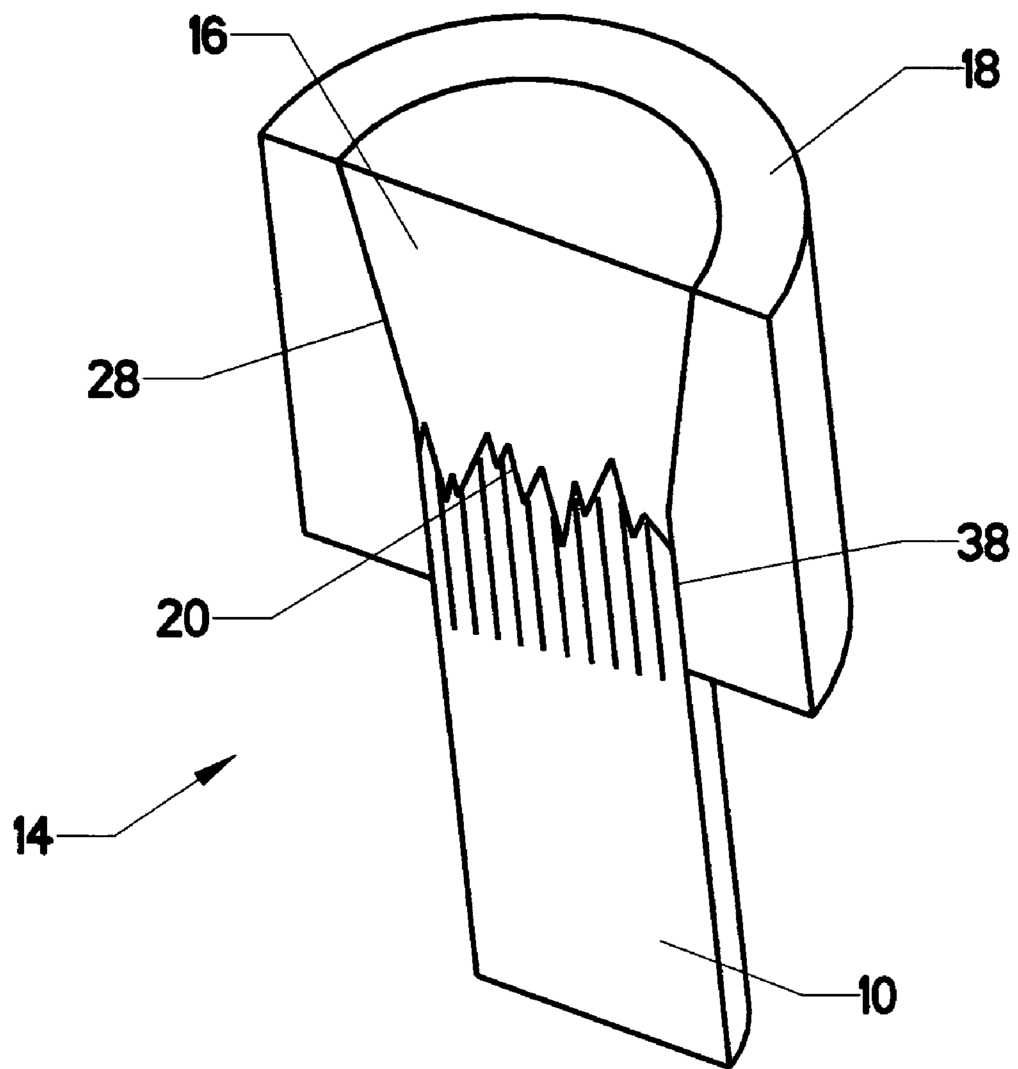
FIG. 1 is a sectional perspective view, showing a prior art termination.
Figure 2:
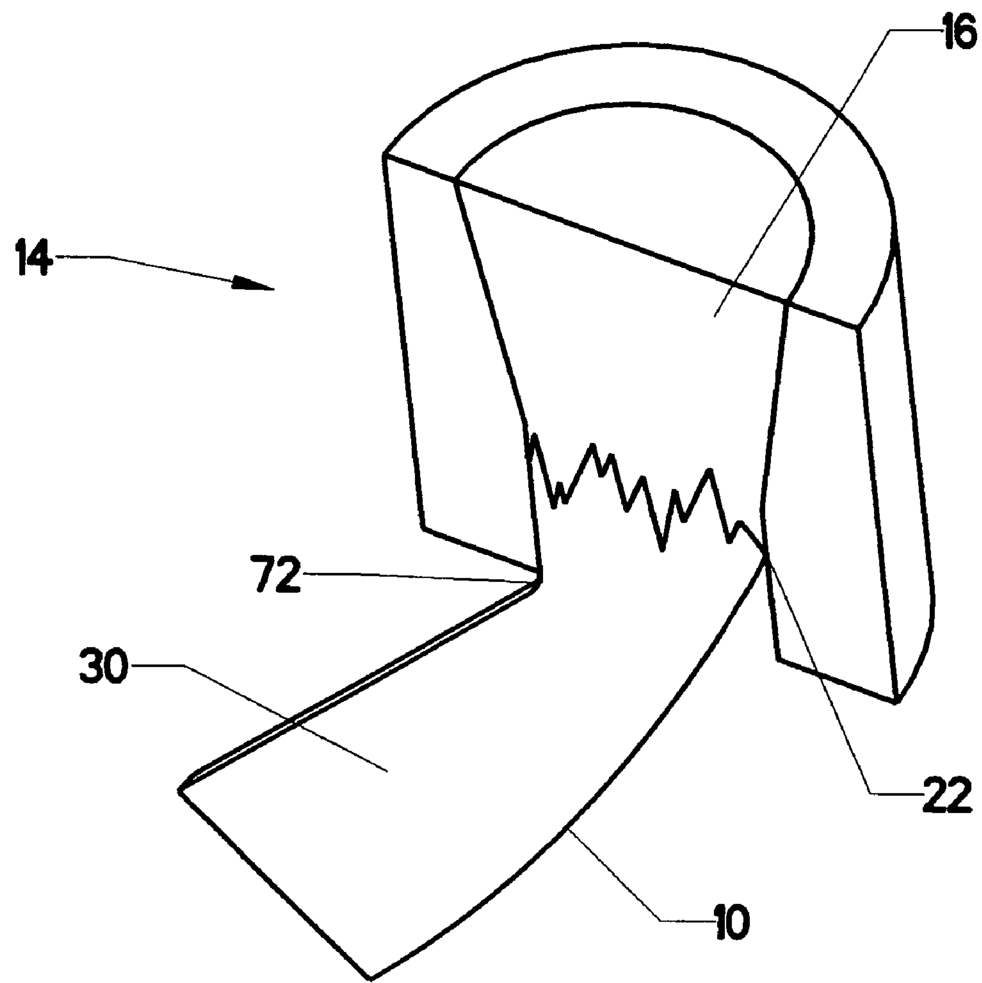
FIG. 2 is a sectional perspective view, showing bending in a prior art termination.
Figure 3:
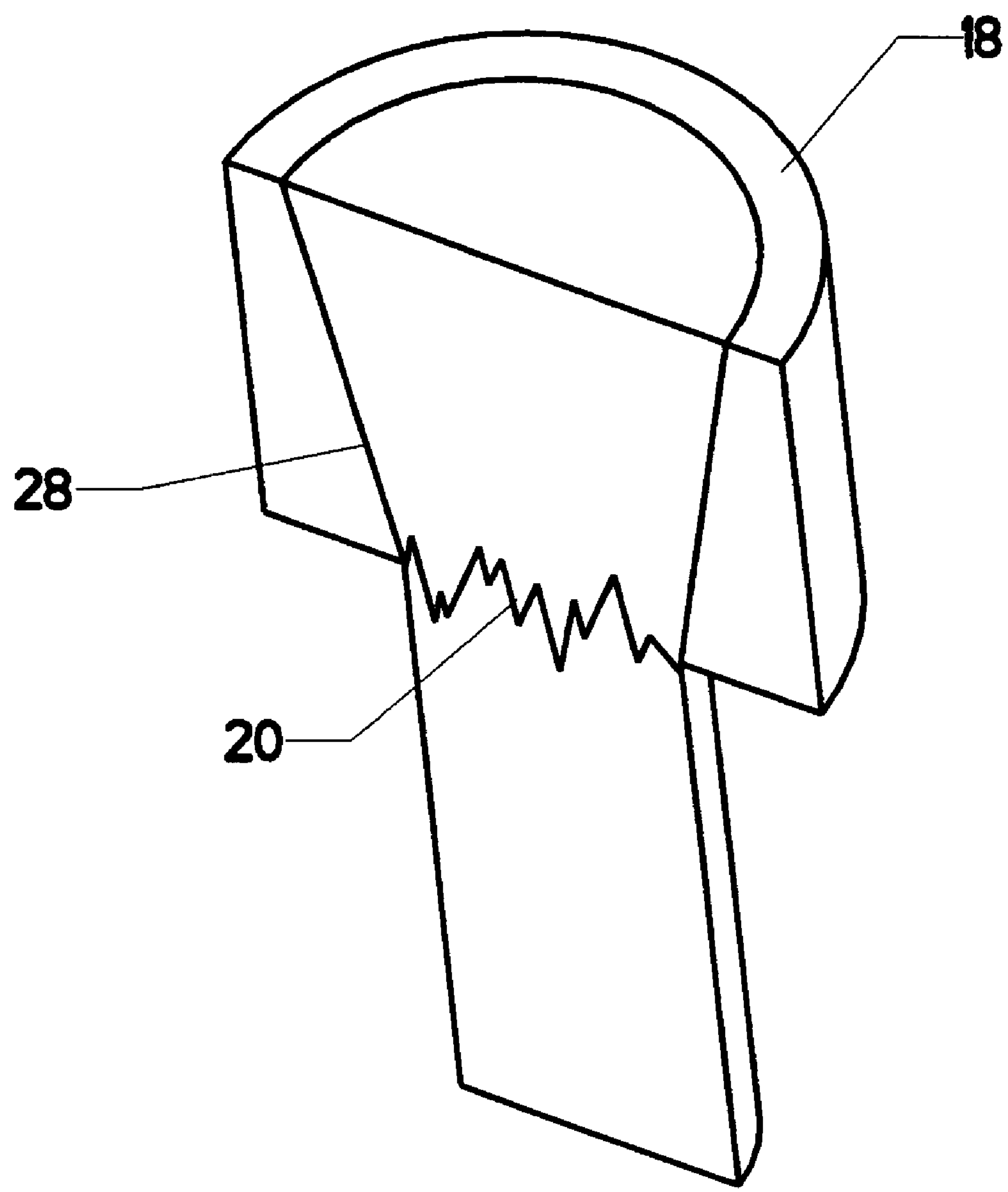
FIG. 3 is a sectional perspective view, showing a common prior art anchor.
Figure 3A:
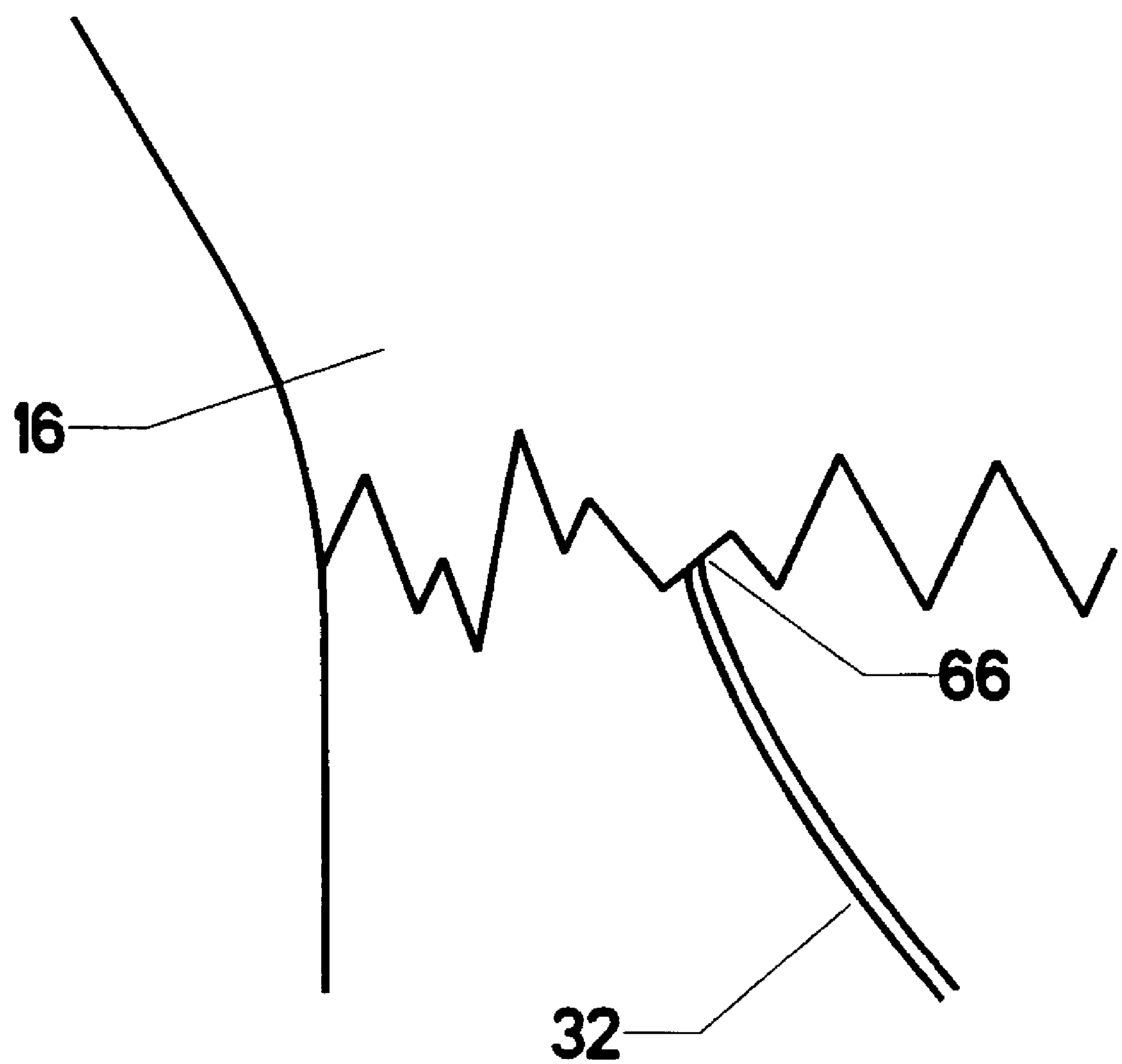
FIG. 3A is a detail view, showing the bending of an individual strand.
Figure 4:
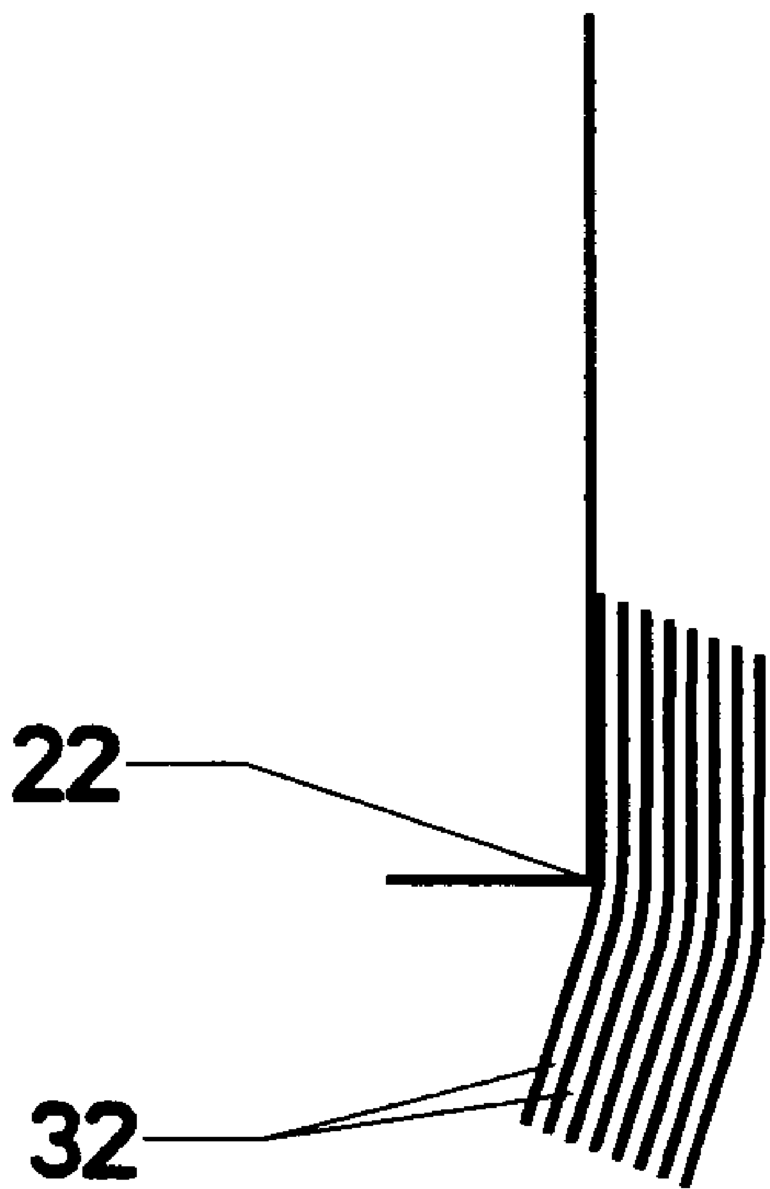
FIG. 4 is a detail view, showing strands bending around a corner.
Figure 5:
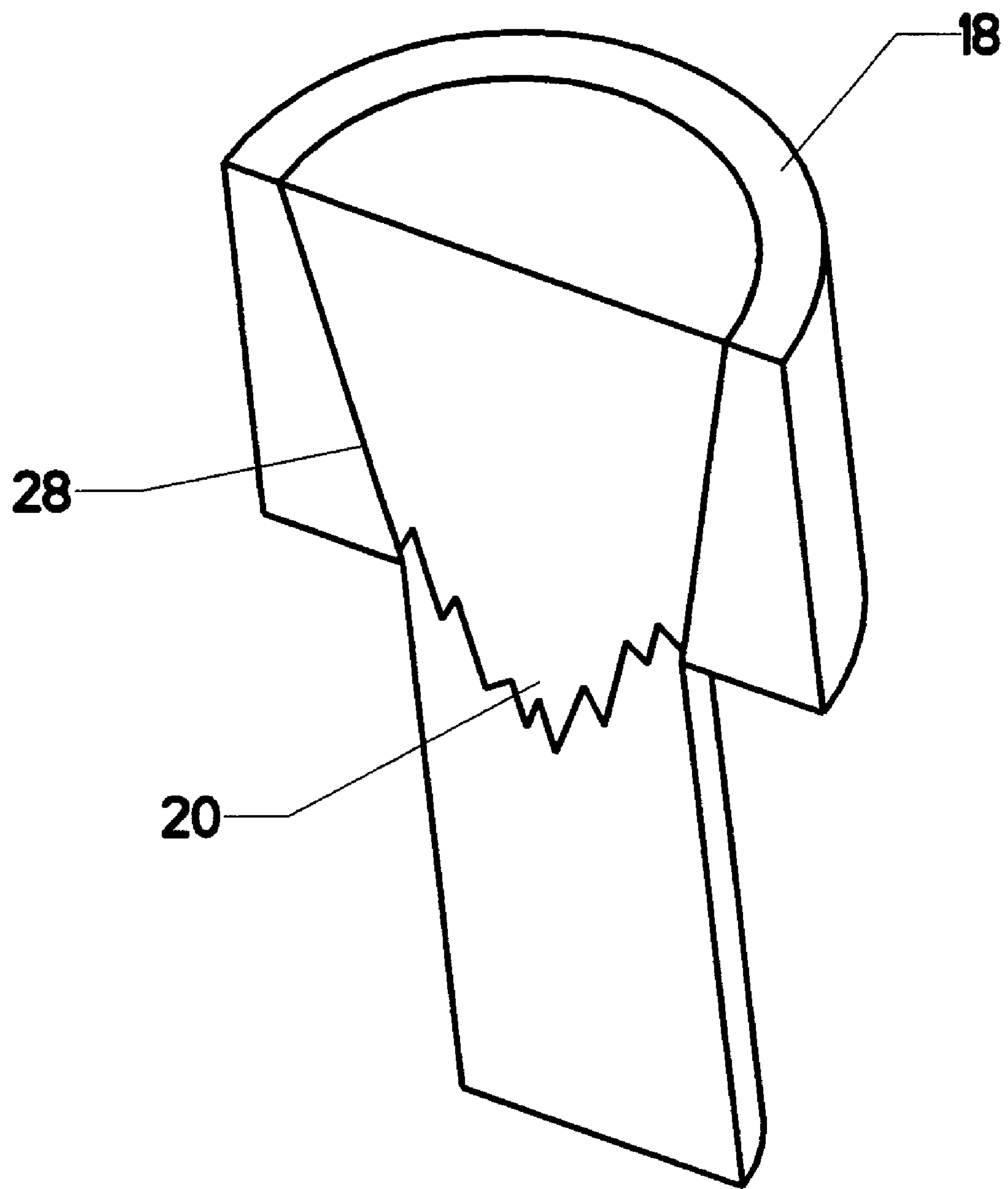
FIG. 5 is a sectional perspective view, showing an irregular potting transition.
Figure 6:
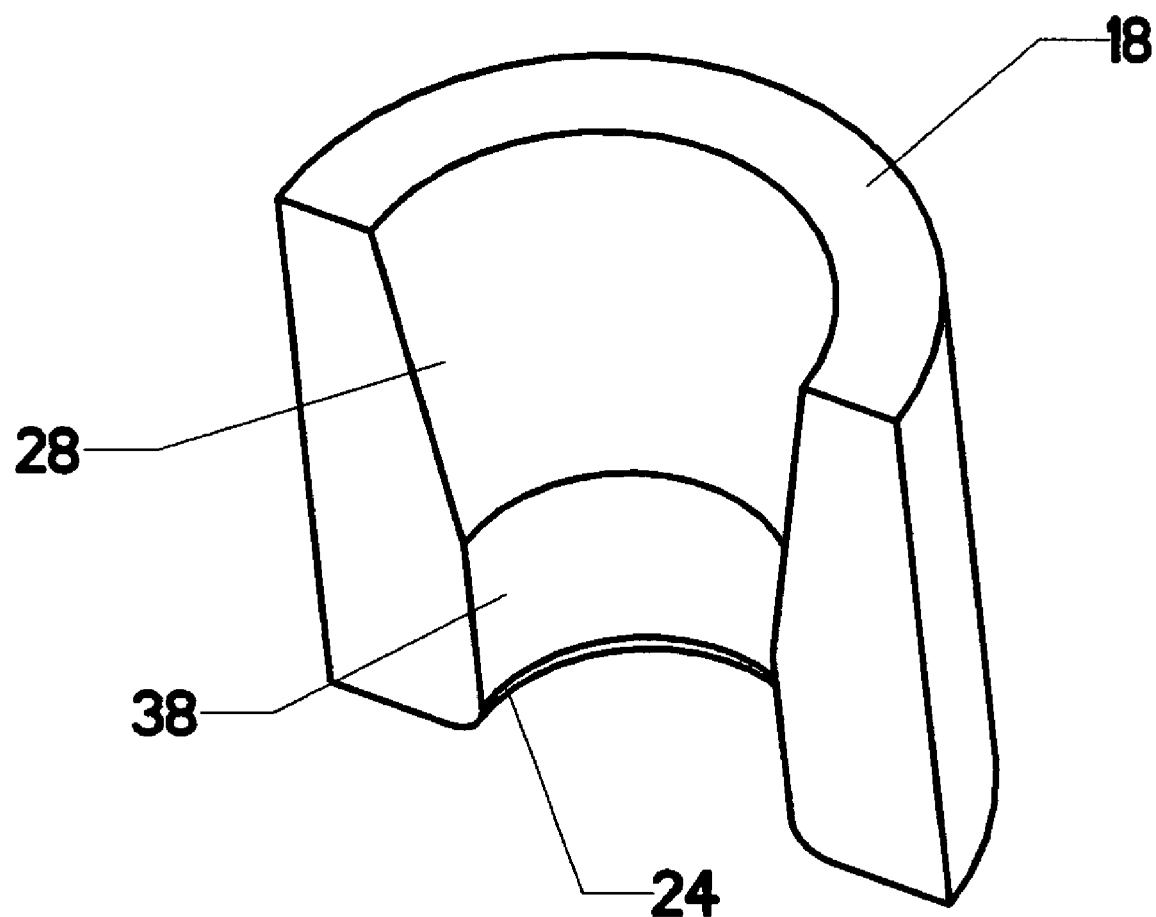
FIG. 6 is a sectional perspective view, showing manufacturing features of the prior art.
Figure 7:
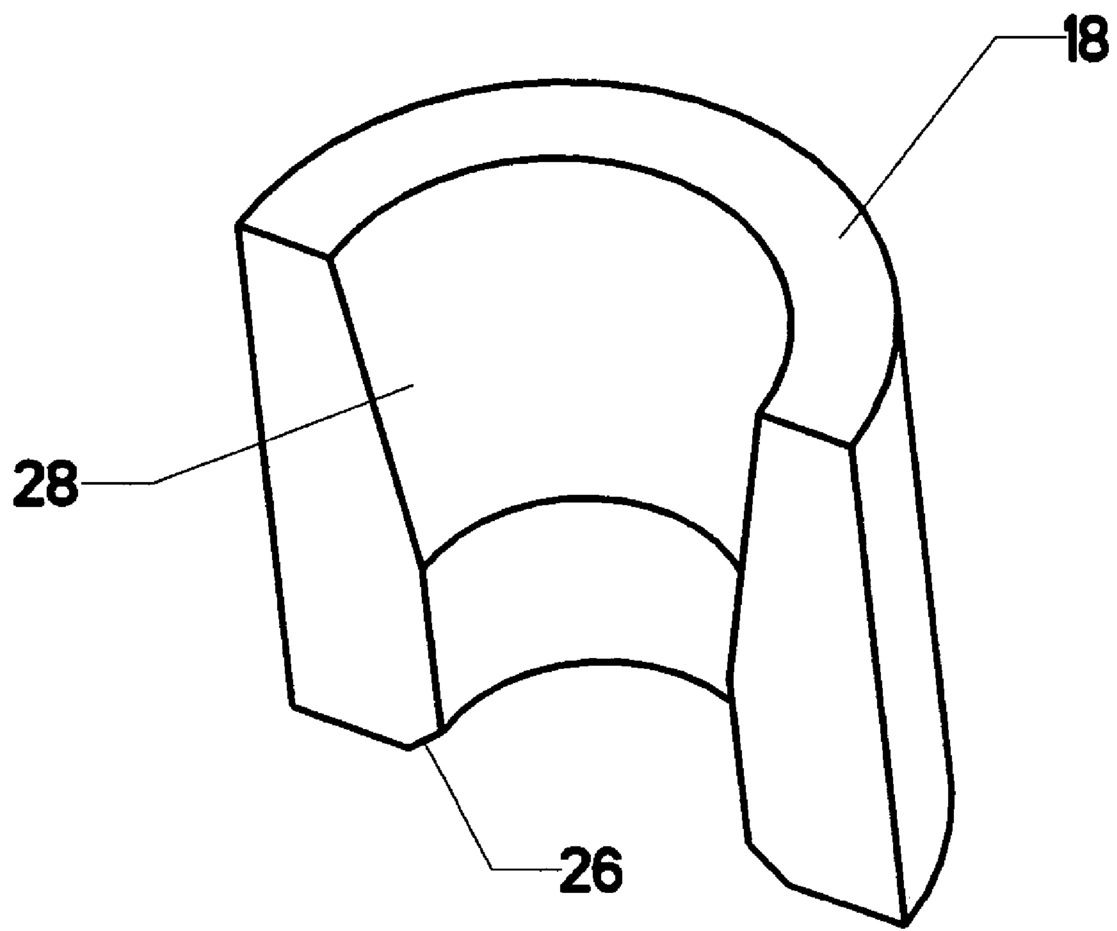
FIG. 7 is a sectional perspective view, showing manufacturing features of the prior art.
Figure 27:
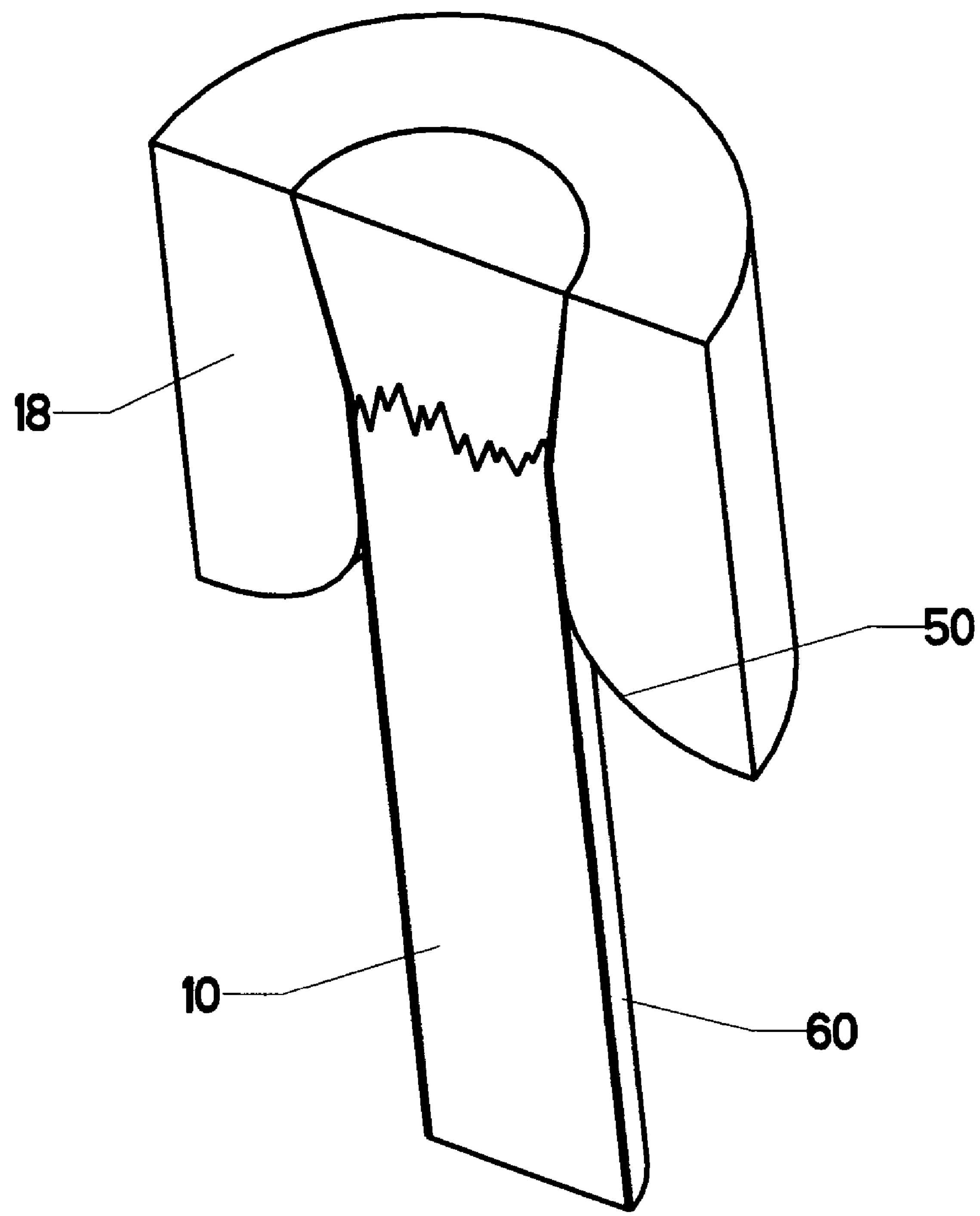
FIG. 27 is a sectional perspective view, showing one embodiment of the present invention.

FIG. 27 shows a cable 10 which is encased by an jacket 60. Smooth expansion 50 allows the jacket to bend without abrading or kinking. Such a jacket binds the cable strands together to preserve the circular cross-sectional shape when the cable is flexed. This binding helps to eliminate the problem of uneven load sharing between strands and the creation of stress concentrations (The reader will recall illustrations of this scenario in FIGS. 2 and 3).

Of course, the jacket does not provide a smooth transition acting alone. It is the combination of the jacket—which substantially maintains the circular cross section—and the smooth expansion 50, around which the jacketed cable bends. Thus, these elements must be sized to interact appropriately. The radius of the smooth expansion is ideally greater than the radius of the cable. The jacket material is preferably pliable enough to bend around the expansion without kinking.

The term "jacket" can include a tape wrap, a shrink wrap tubing, an extruded plastic, a stranded braid ("over-braid"), an over-molded polymer, a string wrap, or other known binding techniques. The jacket can be applied over the length of the entire cable, over a short length in the proximity of the termination, or any length in between.

Figure 28:
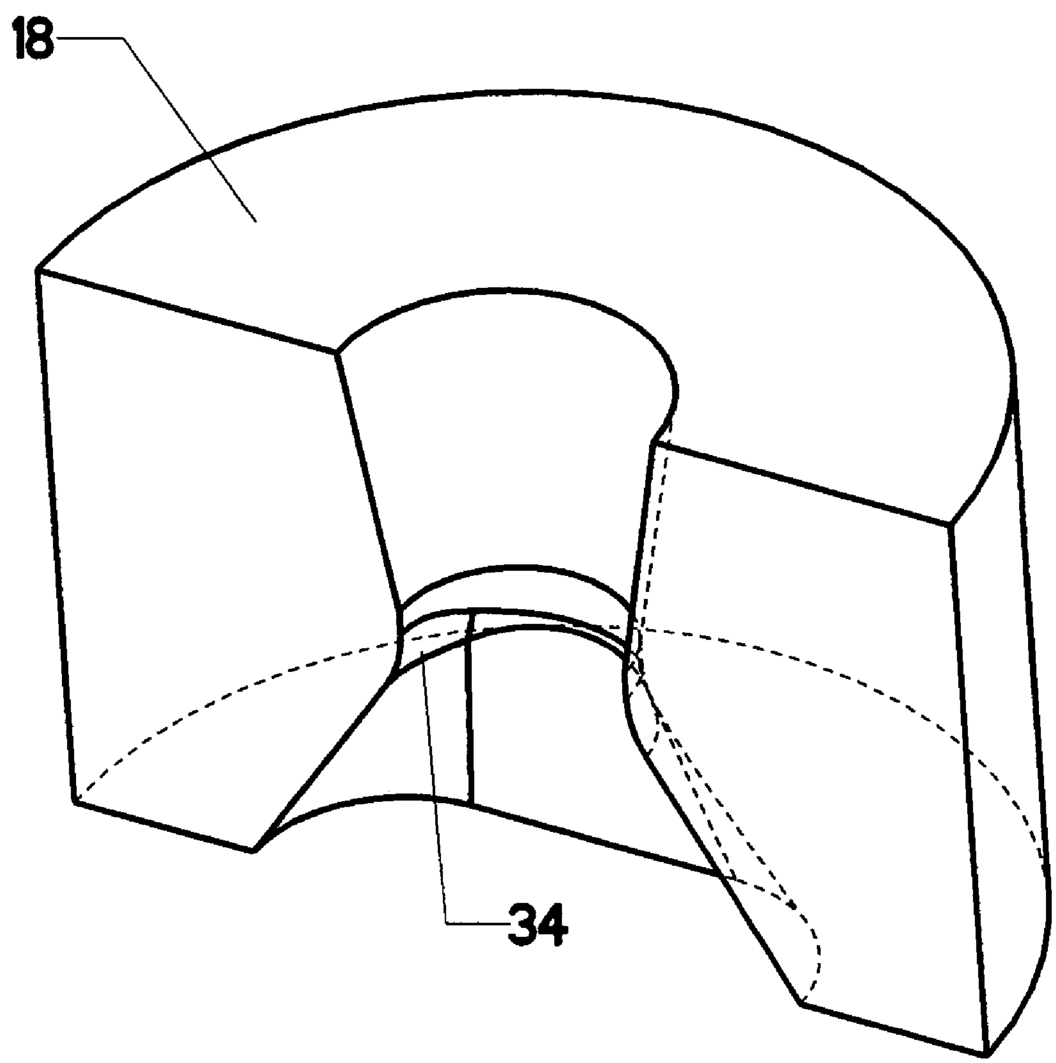
FIG. 28 is a sectional perspective view, showing one embodiment of the present invention.

Although the illustrations show radially symmetric terminations, the reader should note that not all embodiments of the present invention need to be radially symmetric. In some applications, it will be apparent that the cable will flex only in one plane. It may even be desirable to inhibit flexing out of this plane. FIG. 28 shows an anchor having an expansion which is not radially symmetric. Slotted expansion 62 allows the cable to flex freely in only one plane.

Figure 29:
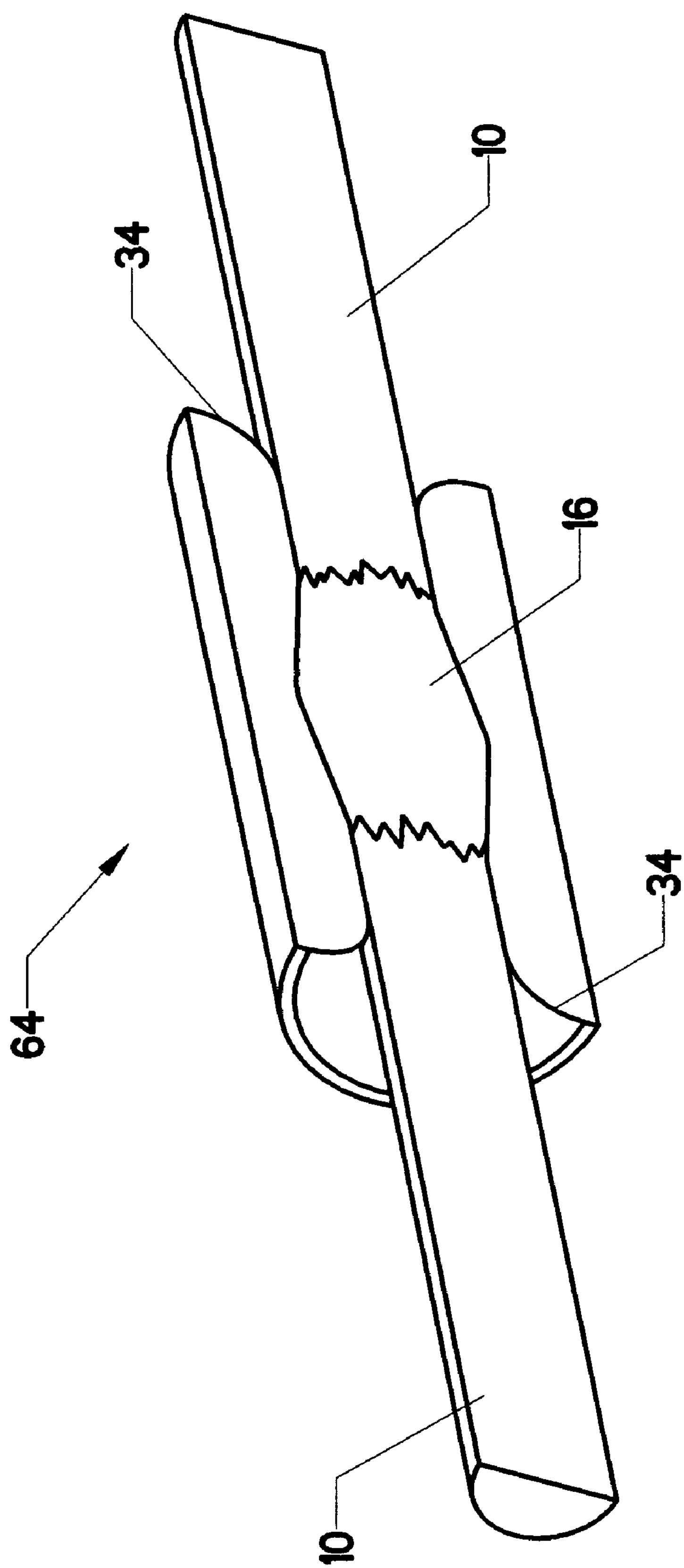
FIG. 29 is a sectional perspective view, showing an intermediate termination.
Figure 30:
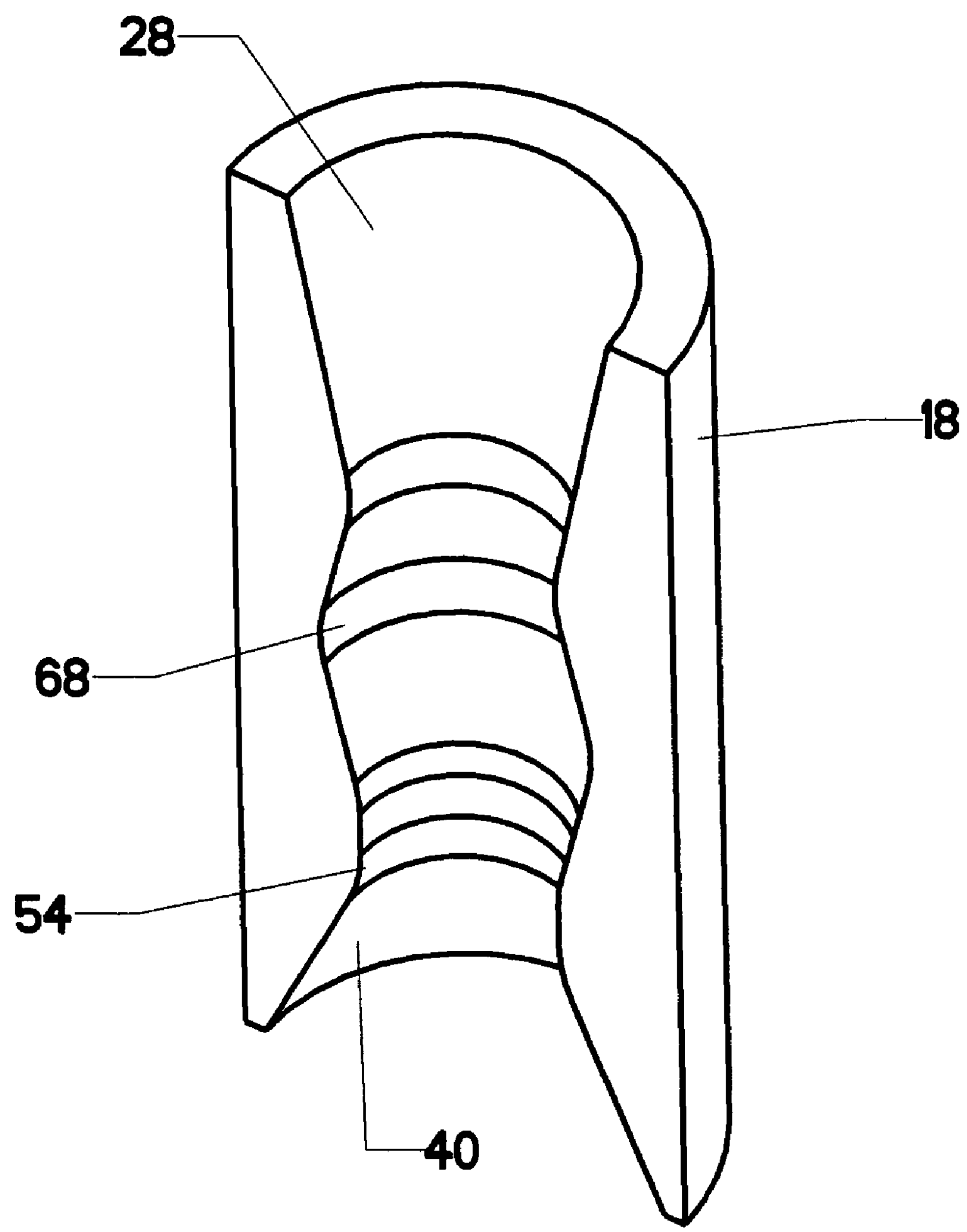
FIG. 30 is a sectional perspective view, showing one embodiment of the present invention.

The preceding examples disclose a termination placed on an end of a cable. The principles disclosed apply equally to terminations placed somewhere between the two ends of a cable. FIG. 29 shows intermediate termination 64. The central portion of the cable is potted into the termination. It has two circular expansions 34, one on each end. The two circular expansions allow both the exiting cable segments to flex laterally with respect to intermediate termination 64.

Figure 31:
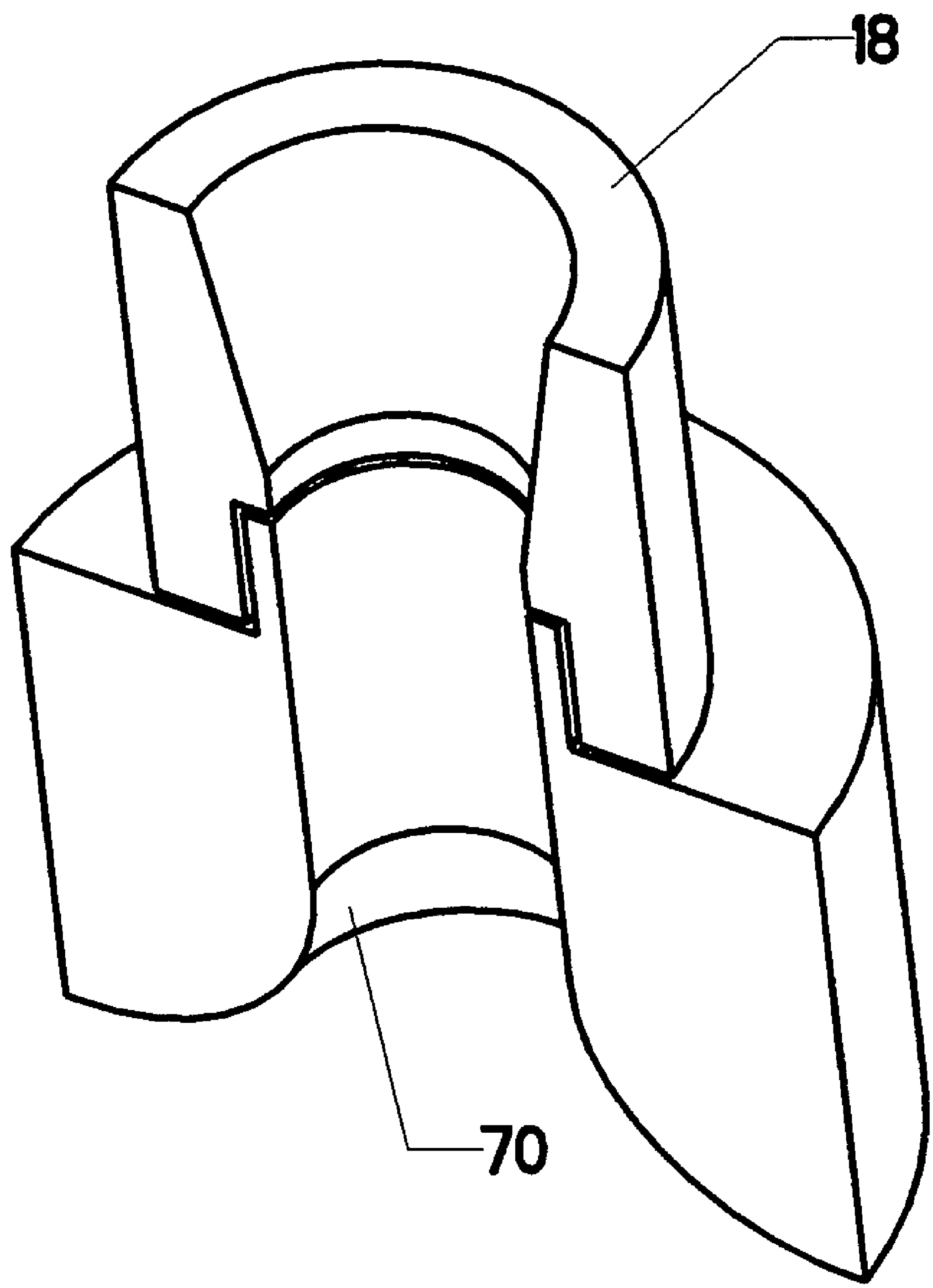
FIG. 31 is a sectional perspective view, showing one embodiment of the present invention.

Finally, those skilled in the art will realize that the expanding portion of the passage through the anchor could be made as a separate piece in order to accommodate manufacturing concerns. FIG. 31 shows such an embodiment, with expansion bell 70 being made as a separate piece from anchor 18. The expansion bell can include a circular expansion, a parabolic expansion, or any other shape disclosed in the preceding.

Thus, the reader should rightly view all the preceding embodiments as providing examples of the invention claimed. The scope of the invention should therefore be fixed by the following claims, and not by the examples provided.

Having described my invention, I claim:

1. A flex-accommodating cable termination on an end of a synthetic cable, comprising:

a. an anchor, having a first side and a second side;

b. a passage passing completely through said anchor from said first side to said second side;

c. said passage including a cable locking region proximate said second side of said anchor;

d. wherein said cable is potted into said cable locking region using a cross-linking adhesive, thereby dividing said cable into a locked portion held within said cable locking region and a freely flexing portion extending out said first side of said anchor;

e. a smoothly curved expansion joining said passage to said first side of said anchor; and f. wherein said freely flexing portion of said cable lying proximate said smoothly curved expansion is completely unencumbered so that it can bend around said smoothly curved expansion when said freely flexing portion is angularly offset from said anchor.

2. A flex-accommodating cable termination as recited in claim 1, wherein said smoothly curved expansion is a circular expansion having a radius at least as large as the radius of said cable.

3. A flex-accommodating cable termination as recited in claim 1, wherein said straight portion is at least twice as long as the radius of said cable.

4. A flex-accommodating cable termination on an end of a synthetic cable, comprising:

a. an anchor, having a first side and a second side;

b. a passage passing completely through said anchor from said first side to said second side;

c. said passage including a cable locking region proximate said second side of said anchor;

d. wherein said cable is potted into said cable locking region using a cross-linking adhesive, thereby dividing said cable into a locked portion held within said cable locking region and a freely flexing portion extending out said first side of said anchor;

e. wherein said cable locking region includes a first expansion, having a small portion and a large portion, wherein said large portion opens into said second side of said anchor;

f. said passage including a straight portion connected to said small portion of said first expansion;

g. said passage including a smoothly curved second expansion connected to said straight portion; and h. wherein said freely flexing portion of said cable lying proximate said smoothly curved expansion is completely unencumbered so that it can bend around said smoothly curved expansion when said freely flexing portion is angularly offset from said anchor.

5. A flex-accommodating cable termination as recited in claim 4, wherein said smoothly curved second expansion is a circular expansion having a radius at least as large as the radius of said cable.

6. A flex-accommodating cable termination as recited in claim 4, wherein said cable is constrained by an encasing jacket over the portion of said cable proximate the junction between said locked portion and said freely flexing portion.

7. A flex-accommodating cable termination as recited in claim 4, wherein said straight portion is at least twice as long as the radius of said cable.

8. A flex-accommodating cable termination on an end of a synthetic cable, comprising:

a. an anchor, having a first side and a second side;

b. a passage passing completely through said anchor from said first side to said second side;

c. said passage including a cable locking region proximate said second side of said anchor;

d. cable locking means for locking said end of said cable to said anchor at said cable locking region, so that said cable is divided into a locked portion held within said cable locking region and a freely flexing portion extending out said first side of said anchor;

e. a smoothly curved expansion joining said passage to said first side of said anchor;

f. a straight portion between said cable locking region and said smoothly curved expansion; and g. an encasing jacket around said cable extending from a point proximate said straight portion to a point beyond said smoothly curved expansion, wherein said encasing jacket is flexible enough to allow said cable to bend around said smoothly curved expansion.

9. A flex-accommodating cable termination as recited in claim 8, wherein said smoothly curved expansion is a circular expansion having a radius at least as large as the radius of said cable.

10. A flex-accommodating cable termination as recited in claim 9, wherein said cable locking means comprises potting said end of said cable into said cable locking region using a cross-linking adhesive.

11. A flex-accommodating cable termination as recited in claim 8, wherein said straight portion is at least twice as long as the radius of said cable.

12. A flex-accommodating cable termination as recited in claim 8, wherein said encasing jacket extends just past said smoothly curved expansion but no further.

13. A flex-accommodating cable termination as recited in claim 8, wherein said straight portion is at least twice as long as the radius of said cable.

14. A flex-accommodating cable termination on an end of a synthetic cable, comprising:

a. an anchor, having a first side and a second side;

b. a passage passing completely through said anchor from said first side to said second side;

c. said passage including a cable locking region proximate said second side of said anchor;

d. cable locking means for locking said end of said cable to said anchor at said cable locking region, so that said cable is divided into a locked portion held within said cable locking region and a freely flexing portion extending out said first side of said anchor;

e. wherein said cable locking region includes a first expansion, having a small portion and a large portion, wherein said large portion opens into said second side of said anchor;

f. said passage including a straight portion connected to said small portion of said first expansion;

g. said passage including a smoothly curved second expansion connected to said straight portion; and h. an encasing jacket around said cable extending from a point proximate said straight portion to a point beyond said smoothly curved expansion, wherein said encasing jacket is flexible enough to allow said cable to bend around said smoothly curved expansion.

15. A flex-accommodating cable termination as recited in claim 14, wherein said smoothly curved second expansion is a circular expansion having a radius at least as large as the radius of said cable.

16. A flex-accommodating cable termination as recited in claim 14, wherein said cable locking means comprises potting said end of said cable into said cable locking region using a cross-linking adhesive.

17. A flex-accommodating cable termination on an end of a synthetic cable, comprising:

a. an anchor, having a first side and a second side;

b. a passage passing completely through said anchor from said first side to said second side;

c. said passage including a cable locking region proximate said second side of said anchor;

d. cable locking means for locking said end of said cable to said anchor at said cable locking region, so that said cable is divided into a locked portion held within said cable locking region and a freely flexing portion extending out said first side of said anchor;

e. a smoothly curved expansion joining said passage to said first side of said anchor;

f. a straight portion between said cable locking region and said smoothly curved expansion; and g. an encasing jacket around said cable extending from a point proximate said straight portion to a point adjacent to said smoothly curved expansion, wherein said encasing jacket is flexible enough to allow said cable to bend around said smoothly curved expansion.

* * * * *